United States Patent
Grünewald et al.

(10) Patent No.: US 10,647,787 B2
(45) Date of Patent: May 12, 2020

(54) PRODUCTION PROCESS FOR PRODUCING WATER-ABSORBENT POLYMER PARTICLES AND BELT DRYER

(71) Applicant: BASF SE, Ludwigshafen am Rhein (DE)

(72) Inventors: Gerald Grünewald, Ludwigshafen (DE); Rüdiger Funk, Niedernhausen (DE); Matthias Weismantel, Jossgrund (DE)

(73) Assignee: BASF SE, Ludwigshafen (DE)

( * ) Notice: Subject to any disclaimer, the term of this patent is extended or adjusted under 35 U.S.C. 154(b) by 263 days.

(21) Appl. No.: 15/571,868

(22) PCT Filed: Apr. 15, 2016

(86) PCT No.: PCT/EP2016/058332
§ 371 (c)(1),
(2) Date: Nov. 6, 2017

(87) PCT Pub. No.: WO2016/180598
PCT Pub. Date: Nov. 17, 2016

(65) Prior Publication Data
US 2018/0086861 A1 Mar. 29, 2018

(30) Foreign Application Priority Data
May 8, 2015 (EP) .................................... 15166995

(51) Int. Cl.
*C08F 6/00* (2006.01)
*C08F 2/10* (2006.01)
(Continued)

(52) U.S. Cl.
CPC ............. *C08F 6/008* (2013.01); *B01J 20/261* (2013.01); *B01J 20/3021* (2013.01); *C08F 2/10* (2013.01);
(Continued)

(58) Field of Classification Search
USPC .......................... 526/920, 930; 34/487, 386
See application file for complete search history.

(56) References Cited

U.S. PATENT DOCUMENTS

| 2,452,983 A | 11/1948 | Birdseye |
| 8,541,528 B2 * | 9/2013 | Funk ....................... C08F 6/008 198/347.1 |
| 2014/0047730 A1 | 2/2014 | Weismantel et al. |

FOREIGN PATENT DOCUMENTS

| CN | 101146832 A | 3/2008 |
| FR | 895974 A | 2/1945 |
| WO | WO-2006/100300 A1 | 9/2006 |

OTHER PUBLICATIONS

Machine translation of Description and Claims of FR-895974-A (Year: 1945).*

(Continued)

*Primary Examiner* — Fred M Teskin
(74) *Attorney, Agent, or Firm* — Marshall, Gerstein & Borun LLP

(57) ABSTRACT

A production process for production of water absorbing polymer particles, including drying an aqueous polymer gel in a belt drier with a conveyor belt having a drier setup in the interior, in which drying air in the interior of the drier setup is conducted in countercurrent counter to the conveying direction and the interior of the drier setup is kept substantially at a reduced pressure relative to the ambient pressure outside the drier setup, and the interior has and/or forms a pressure zone, and is especially divided into a number of pressure zones.

19 Claims, 7 Drawing Sheets

Figure 1:
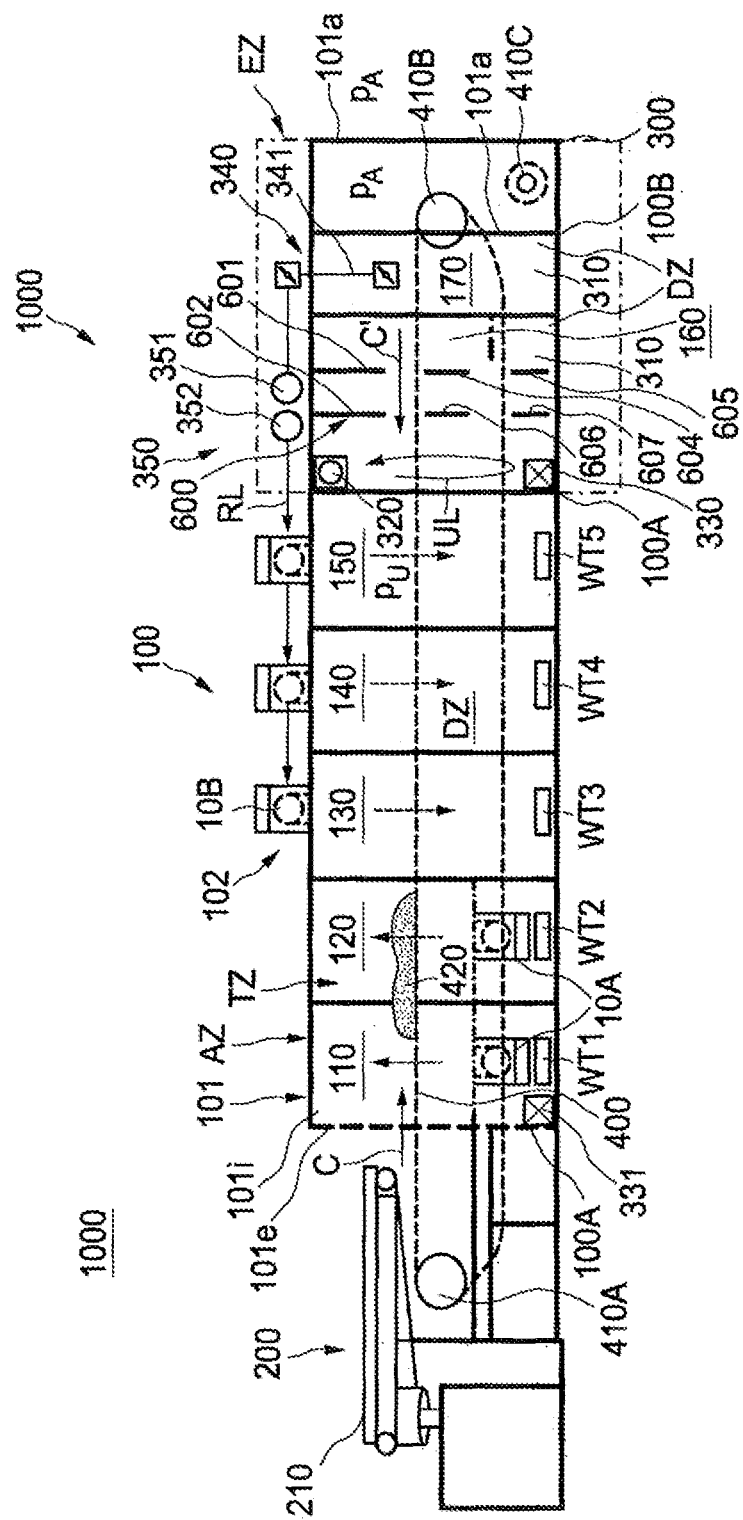

(51) Int. Cl.
| | |
|---|---|
| *C08F 2/18* | (2006.01) |
| *F26B 3/04* | (2006.01) |
| *F26B 17/04* | (2006.01) |
| *F26B 5/04* | (2006.01) |
| *C08F 20/06* | (2006.01) |
| *B01J 20/26* | (2006.01) |
| *B01J 20/30* | (2006.01) |
| *C08J 3/12* | (2006.01) |
| *F26B 21/00* | (2006.01) |
| *F26B 21/02* | (2006.01) |
| *F26B 21/10* | (2006.01) |

(52) U.S. Cl.
CPC .............. *C08F 20/06* (2013.01); *C08J 3/12* (2013.01); *F26B 3/04* (2013.01); *F26B 5/04* (2013.01); *F26B 5/041* (2013.01); *F26B 17/04* (2013.01); *F26B 21/004* (2013.01); *F26B 21/02* (2013.01); *F26B 21/10* (2013.01); *C08J 2357/00* (2013.01)

(56) References Cited

OTHER PUBLICATIONS

Buchholz, Fredric L., et al. *Modern Superabsorbent Polymer Technology*, "Commercial Processes for the Manufacture of Superabsorbent Polymers." New York: John Wiley & Sons, Inc., 1998, pp. 71-103.
Frank, Marcus. (2003): Superabsorbents. In *Ullmann's Encyclopedia of Industrial Chemistry*, 6th ed. (vol. 35, pp. 81-85). Weinheim, Germany: Wiley VCH.
International Search Report for PCT Patent Application No. PCT/EP2016/058332, dated Jul. 25, 2016.

\* cited by examiner

PRODUCTION PROCESS FOR PRODUCING WATER-ABSORBENT POLYMER PARTICLES AND BELT DRYER

CROSS-REFERENCE TO RELATED APPLICATIONS

This application is the U.S. National Phase of PCT/EP2016/058332, filed Apr. 15, 2016, which claims the benefit of European Patent Application No. 15166995.9, filed May 8, 2015.

FIELD OF THE INVENTION

The invention relates to a production process for producing water-absorbing polymer particles according to the preamble of claim 1. The invention further relates to a belt drier for drying an aqueous polymer gel according to the preamble of claim 11.

The production process has the following steps: polymerizing an aqueous monomer solution or suspension for production of a polymer gel; drying the aqueous polymer gel in a belt drier with a conveyor belt by accommodating the aqueous polymer gel on the conveyor belt and conveying the polymer gel on the conveyor belt in a conveying direction of the conveyor belt; crushing and/or grinding the dried polymer gel to give water-absorbing polymer particles.

Drying is accomplished in that the belt drier has a drier setup within which the conveyor belt is conducted.

BACKGROUND OF THE INVENTION

Water-absorbing or superabsorbent polymers (SAPs, called superabsorbents for short) refer to crosslinked hydrophilic polymers that can absorb several times their mass in the dry state (sometimes more than one thousand times) of water.

The main field of use of superabsorbents is in the hygiene sector and also plays a major role in the medical sector in wound dressings and plasters. Further important fields of use for superabsorbents are agriculture and horticulture, where superabsorbents are used in order to improve the ability of soil to store moisture.

The demands on a superabsorbent depend on the particular field of use, and for that reason the properties of the superabsorbents (for example the degree of swelling and the swelling rate) have to be adjusted correspondingly. A matter of significance for this purpose is whether the absorption of the liquid to be absorbed is to take place under pressure and/or at relatively high temperature, which is especially important for the use of superabsorbents in incontinence products. Other matters of major significance are the nature and composition of the liquid to be absorbed, since the degree of swelling of a superabsorbent is significantly affected by the salt content of the swelling agent.

The water-absorbing polymers are especially polymers formed from (co)polymerized hydrophilic monomers, graft copolymers of one or more hydrophilic monomers on a suitable graft base, crosslinked cellulose or starch ethers, crosslinked carboxymethylcellulose, partly crosslinked polyalkylene oxide, or natural products swellable in aqueous liquids, for example guar derivatives. Water-absorbing polymers of this kind are used to produce diapers, tampons and sanitary napkins, but also as water-retaining agents in market gardening.

The production of the water-absorbing polymers is described, for example, in the monograph "Modern Superabsorbent Polymer Technology", by F. L. Buchholz and A. T. Graham, Wiley-VCH, 1998 or in Ullmanns "Encyclopedia of Industrial Chemistry", 6th edition, volume 35, pages 73 to 103.

A superabsorbent polymer in the aqueous polymer gel state is regarded as being in a wet state and hence can also be referred to in general terms as wet material; in other words, the aqueous polymer gel still has a considerable proportion of water before drying; especially as described below. The aqueous polymer gel is obtained by polymerizing a monomer solution or suspension. The aqueous polymer gel with still-aqueous polymer particles is preferably introduced into the belt drier in granular form, for example with a solids content of 40-60%. In this state, the aqueous polymer gel is basically already in crosslinked form with a desired degree of crosslinking, especially in homogeneously crosslinked form at first, especially with a comparatively low degree of crosslinking, especially, as described further down, barely surface crosslinked at all at first.

A superabsorbent polymer in the a water-absorbing polymer particle state is considered to be in a state after drying; in other words, it has a low residual water content of the polymer particles after the drying of aqueous polymer gel, especially as described below; the superabsorbent polymer is thus preferably in the form of a dried polymer gel, especially dried polymer particles. In this state, the water-absorbing polymer particles can preferably be postcrosslinked, especially surface crosslinked, in which case the degree of surface crosslinking is preferably above the above-mentioned comparatively low degree of initially homogeneous crosslinking. Preferably, after the polymerization, an aqueous polymer gel of the water-absorbing polymers is obtained, which is dried. The principles of drying of the aqueous polymer gel to give a water-absorbing polymer, especially dried polymer gel, comprising water-absorbing, especially dried, polymer particles is likewise described in the monograph "Modern Superabsorbent Polymer Technology", by F. L. Buchholz and A. T. Graham, Wiley-VCH, 1998, on pages 87 to 93.

In the belt drier, the aqueous polymer gel is dried to give a partly dried polymer gel and hence takes the form of a dry cake. The dry cake preferably takes the form of a strand of partly dried polymer gel, i.e. of a partly dried polymer strand, on the belt of the belt drier which thus extends through the drier setup of the belt drier.

The dry cake, at the end of the belt drier, i.e. on leaving the drier setup, is in the form of a substantially dried strand of dried polymer gel, for instance in the form of a slab or of a sheetlike strand, i.e. of a dried polymer strand. The partly dried polymer gel and the dried polymer gel of the dry cake are sometimes already referred to hereinafter by the terminology "dried polymer particles"; both cases are covered by the terms "superabsorbent or water-absorbing polymer gel" or "dried polymer gel", as opposed to "aqueous polymer gel".

Given a comparatively broad size distribution of particles of the aqueous polymer gel to be dried, complete drying of all polymer particles can often be effected under drying conditions under which a majority of the particles have if anything been overdried. Ultimately, the drying process should also be economically viable and afford the desired polymer gel quality. After an appropriate dwell time of the aqueous polymer gel to be dried in the belt drier, it is to be dried to give a superabsorbent polymer comprising water-absorbing polymer particles having a desired water content, preferably low water content and hence residual moisture content. Accordingly, in an improved practice, drying conditions are preferably chosen that constitute a compromise between exploitation of the drier capacity and the processibility of the water-absorbing polymer particles.

The dried polymer gel in the form of a substantially dried polymer strand is then fed to a crusher or similar comminutor at the end of the belt drier. What are then formed are thus well-dried polymer particles of dried polymer gel.

Some of the dried polymer particles in that case take the form of crushed dried polymer gel, for example comparatively coarse lumps, and some take the form of unavoidable crush residue of dried polymer gel. In particular, the crush residue of dried polymer gel comprises fine polymer particle powder comprising fine and ultrafine particles.

The dried polymer particles are then preferably sent to a grinding operation and processed further to give ground dried polymer particles.

The ground dried polymer particles can then be sent to a sieving operation. A midsize fraction then has an already preferred desired particle size and can be separated off at this early stage. An oversize fraction or fines fraction can optionally be ground, sieved or processed once again and added to the midsize fraction.

The dried, ground and sieved polymer particles of the midsize fraction can be surface reprocessed.

The dried, ground and sieved and surface reprocessed polymer particles can be subjected to safeguard sieving.

The process preferred for the present concept is a conveyor belt process (with a conveyor belt of the belt drier). The belt drier is a convective drying system for the treatment of polymer gels through which air can flow. The aqueous polymer gel to be dried is applied to an endless, gas-permeable conveyor belt, toward which there is a flow of a preferably heated gas stream, preferably air. Drying air hereinafter means any kind of drying gas, especially air or air-like gases, preferably heated drying gases, especially heated air or heated air-like gases. In the drying operation, it is possible to use continuous convection belt driers; this relates hereinafter to a belt drier of the type specified at the outset, especially an air circulation belt drier. The belt drier mentioned at the outset is designed particularly for drying of a deformable, pasty product of limited flowability and in piece form, especially for an aqueous polymer gel. In a continuous belt drier, the polymer gel layer of an aqueous polymer gel, applied in the form of an aggregate through which air can flow, on a perforated conveyor belt is transported through the drying space and dried in the process at first to give partly dried polymer gel and finally to give dried polymer gel; the latter is then processed further to give the abovementioned dried polymer particles as water-absorbing polymer particles.

The drying gas that flows through the product layer of the dry cake of partly dried polymer gel and then dried polymer gel serves both to introduce heat into the aqueous polymer gel to be dried or into the partly dried water absorbing polymer particles and to transport away evaporating moisture; in principle, this is achieved in that a temperature in the drier increases at least in a subsection in line with the conveying direction of the polymer gel, and the moisture content of the aqueous polymer gel to be dried decreases in conveying direction of the conveyor belt. The drying gas used is preferably air as drying air. In the case of a belt drier cited at the outset, in that case especially in the form of an air circulation belt drier, the drying air that flows through the polymer gel layer can also be conducted as circulating air; this can especially also be supplemented with fresh air and thus replaced fully or partly as required; in principle, supply of pure fresh air, however, seems to be less energy-efficient than intelligent air recycling; especially from an end zone from which the recycled air has comparatively low moisture loading in upstream zones of the drier.

Compared to other designs of drier, the belt drier has the advantage that (apart from gravity) there is no significant mechanical stress that impairs the polymer gel, since the aqueous polymer gel or the water-absorbing polymer particles lie loose on a conveyor belt. In principle, it is possible to configure the construction of a belt drier with a single drier zone. In one modification, it is also possible to configure the construction of a number of drier zones in full or in part. In the simplest case, the drier setup comprises a single drier zone; or in a more complex case a number of drier zones.

A drier zone may, but need not, have a modular construction, i.e. be constructed by means of a single drier module or a multitude of drier modules. Ultimately, a drier setup can be constructed by means of a number of drier modules. A belt drier comprises, for example, a polymer gel application module, a number of drier modules for formation of one or more drier zones, and a discharge module.

The discharge module serves to discharge the superabsorbent polymer in the form of the water absorbing polymer particles; more particularly, the conveyor belt ends, or has a turning point, in the discharge module; the superabsorbent polymer in the discharge module may fall onto an abovementioned crusher or similar comminutor.

Belt driers having transport belts are to be distinguished from belt reactors. While a belt reactor is used to produce aqueous polymer gel from its starting materials, a belt drier is used to produce water-absorbing polymer particles from an aqueous polymer gel, especially to produce the water-absorbing polymer particles mentioned, preferably from an aqueous polymer gel that has first been homogeneously crosslinked with the desired degree of crosslinking, and optionally also surface crosslinked.

WO 2006/100300 A1 discloses a process for preparing water-absorbing polymers by polymerization of a monomer solution and drying of the aqueous polymer gel obtained by the polymerization in a belt drier by means of a heated air stream, wherein the drying is conducted in at least two temperature zones and/or the flow direction of the drying air stream through the aqueous polymer gel is conducted from beneath in the upstream section of a belt drier and from above in the downstream section of the belt drier. This involves circulating the drying air for it to undergo maximum saturation in multiple passes through the polymer gel layer. For economic drying of the water-absorbing polymers, the air flow regime in the drier is systematically designed for energy-efficient operation. Various air flow regime concepts that have advantages in terms of drying characteristics and energy exploitation are possible: in crosscurrent from the top downward, alternating, cross-countercurrent or else in cross-cocurrent. Preference is given here to an overriding air flow regime in cross-countercurrent. The drying is preferably conducted at a pressure reduced relative to atmospheric pressure. This reduced pressure, as the differential from atmospheric pressure, is preferably at least −0.5 mbar, more preferably at least −2 mbar, most preferably at least −10 mbar (minus sign indicates reduced pressure). The reduced pressure in the drier relative to atmospheric pressure brings about more favorable gas flow in the drier and hence more homogeneous drying. WO 2008/034786 A1 describes a process for producing color-stable water-absorbing polymer particles having a lower degree of neutralization, in which a process is conducted by drying in at least two temperature zones.

SUMMARY OF THE INVENTION

It is an object of the invention to specify an improved production process and an improved apparatus for production of water-absorbing polymer particles. More particularly, an energy-efficient drying process is to be specified, preferably exploiting a countercurrent flow regime, i.e. with guiding of drying air in countercurrent with respect to a conveying direction of the polymer gel stream on the conveyor belt. Preferably, a cross-countercurrent air flow regime is to be utilized; in other words with crossed guiding of a polymer gel stream on the conveyor belt in conveying direction and a circulating air stream of the drying air (crosscurrent). More particularly, recycling of drying air as recycled air with respect to a polymer gel stream is to be utilized, i.e. counter to a conveying direction of the conveyor belt (countercurrent). More particularly, drying characteristics of the aqueous polymer gel are to be improved and/or a proportion of waste products is to be reduced. More particularly, product conditioning and/or energy-efficient drying are also to be taken into account as an economic factor.

More particularly, intake of infiltrated air and/or intake of unwanted particles into the interior of a drier module of a belt drier is to be reduced. More particularly, intake of infiltrated air and/or intake of unwanted particles through the intake of infiltrated air into the interior of a drier module of a belt drier is to be reduced.

Preferably, in an improved drying process, the cost and inconvenience associated with maintenance and cleaning is to be reduced, especially with regard to internals in an air recycling conduit, for example with regard to a cooling unit and/or heating unit connected thereto, especially with regard to a heating register and/or feed air heater present therein. More particularly, this is to lead to polymer gel properties that remain constant over time, coupled with very substantially constant or appropriately adjusted operating parameters. Preferably, intake of particles into an air recycling conduit, especially into internals in an air recycling conduit—such as a cooling unit and/or heating unit, for example heating register—is reduced, preferably also in an energy-efficient drying process with guiding of drying air in countercurrent, especially in the case of air recycling and the exploitation of cross-countercurrent flow.

DETAILED DESCRIPTION OF THE PREFERRED EMBODIMENTS

With regard to the production process, the object is achieved by the invention with a production process of claim 1.

With regard to the apparatus, the object is achieved by the invention with a belt drier of claim 11.

Advantageous developments of the invention can be taken from the dependent claims and individually specify advantageous ways of implementing the concept elucidated within the scope of the objective and with regard to further advantages.

The starting point is a production process of the type specified at the outset according to the preamble of claim 1.

Drying is accomplished in that the belt drier has a drier setup in the interior of which the conveyor belt is guided.

What is envisaged is that drying air in the interior of the drier setup is conducted in countercurrent counter to the conveying direction and the interior of the drier setup is kept substantially at a reduced pressure relative to the ambient pressure outside the drier setup. Preferably, the interior of the drier setup is kept completely at a reduced pressure relative to the ambient pressure outside the drier setup.

The interior of the drier setup has and/or forms a pressure zone. The interior of the drier setup is preferably divided into a number of pressure zones.

It is further envisaged that, in line with conveying direction, a first internal pressure is formed as inlet pressure at a polymer gel inlet in at least one pressure zone with a first pressure differential from an ambient pressure, and a second internal pressure is formed as outlet pressure at a polymer gel outlet in the at least one pressure zone with a second pressure differential from an ambient pressure. The second pressure differential is smaller than the first pressure differential.

In the present context, a pressure zone inlet is referred to as polymer gel inlet, since this indicates the intake of the aqueous polymer gel into the pressure zone in line with conveying direction (referred to hereinafter as C) in the operation of the belt drier. In the present context, a pressure zone outlet is referred to as polymer gel outlet, since this indicates the exit of the dried polymer gel from the pressure zone in line with conveying direction (referred to hereinafter as C) in the operation of the belt drier. A pressure zone outlet as polymer gel outlet corresponds here to the intake of drying air into the pressure zone with guiding of the drying air in the interior of the drier setup in countercurrent (in defined countercurrent direction C') counter to the conveying direction of the polymer gel, wherein the interior of the drier setup is kept substantially at a reduced pressure, preferably completely at a reduced pressure, relative to the ambient pressure outside the drier setup. A pressure zone inlet as polymer gel inlet corresponds here to the exit of drying air from the pressure zone with guiding of the drying air in the interior of the drier setup in countercurrent (in defined countercurrent direction C') counter to the conveying direction of the polymer gel, wherein the interior of the drier setup is kept substantially at a reduced pressure, preferably completely at a reduced pressure, relative to the ambient pressure outside the drier setup.

The production process is preferably conducted with utilization of a cross-countercurrent air flow regime; in other words, with guiding of the drying air in the interior of the drier setup in countercurrent counter to the conveying direction of the polymer gel on the conveyor belt, wherein the interior of the drier setup is kept substantially at a reduced pressure, preferably completely at a reduced pressure, relative to the ambient pressure outside the drier setup and, moreover, a crossing flow of a polymer gel stream on the conveyor belt and a stream of the drying air (crosscurrent flow), namely in that case preferably in the form of circulating air, is envisaged.

Preferably, recycling of drying air as recycled air is additionally possible counter to conveying direction of the polymer gel on the conveyor belt, especially counter to the conveying direction of the conveyor belt and outside the drier setup, for example in a periphery thereof by means of corresponding ventilation constructions. Air recycling is understood to mean recycling of the air withdrawn from the drier setup, which is removed in an air withdrawal conduit and returned as abovementioned recycled air counter to the conveying direction of the conveyor belt and is fed back to the drier setup at a point counter to the conveying direction of the polymer gel on the conveyor belt, for example via an air-guiding orifice to the pressure zone. Especially for the preferred case of an air flow regime in cross-countercurrent in the drier setup, it has been found to be advantageous that the second pressure differential is less than the first pressure differential.

Advantageously, especially for the preferred case of a cross-countercurrent air flow regime in the drier setup, there is an increase in the absolute pressure from the first to the second internal pressure of the pressure zone in at least one region of the pressure zone in line with the conveying direction of the conveyor belt; this is especially applicable to the end zone of the drier setup. Advantageously, especially for the preferred case of a cross-countercurrent air flow regime in the drier setup, there is an increase in the absolute pressure from the first to the second internal pressure in a region of the at least one pressure zone in line with the conveying direction of the polymer gel on the conveyor belt.

The starting point for the concept is that it is possible in principle to design the inner region of the drier setup, i.e. the interior thereof, as a pressure zone such that a drying pressure (pressure) can be established. The interior of the drier setup accordingly has and/or forms a pressure zone. The interior may also be divided into a number of pressure zones, i.e. into one, two or more pressure zones. The division may arise from a pressure profile and may be implemented, for example, in a functional manner and/or by construction for establishment of a pressure or pressure profile. More particularly, a division into a number of pressure zones arises from the arrangement of elements that supply air to the interior and elements that remove air from the interior, for example an air supply element as described further down or an air withdrawal conduit, since these are used to define a pressure level in the interior; in this respect, a pressure is established. The inner region of the drier setup can accordingly be divided into one or more regions that are optionally adjustable and especially controllable with regard to the pressure. More particularly, a pressure zone is understood to mean a region of the interior of the drier setup in which a pressure, for example an inlet pressure and/or outlet pressure, can be established. More particularly, a pressure—apart from unavoidable couplings—is to be adjustable substantially independently from other pressure zones in the drier setup and/or substantially independently from the ambient pressure (atmospheric pressure) outside the drier setup. For example, it may be possible to establish a first internal pressure as inlet pressure at a polymer gel inlet in at least one pressure zone with a first pressure differential from an ambient pressure, and/or a second internal pressure as outlet pressure at a polymer gel outlet in the at least one pressure zone with a second pressure differential from an ambient pressure.

In the context of a particularly preferred development elucidated in detail further down, one or more pressure zone subregions may be provided in the at least one pressure zone—each with a particular pressure profile in the interior of the drier setup—in such a way that the pressure in the pressure section follows a pressure profile of the pressure zone in each pressure zone subregion. The pressure section variations that the pressure zone subregions follow may be distinguishable from one another by a pressure variation that a pressure gradient region follows. The pressure variation may, for example, be formed by a crucial pressure stage or pressure ramp or the like. A crucial pressure stage or pressure ramp or similar pressure variation followed by a pressure gradient region may, for example, be generated within a pressure zone by a transverse wall oriented transverse to the conveying direction of the conveyor belt, in order thus to configure the pressure profile of the pressure zone to a crucial degree.

Generally, it may additionally be the case that establishment of different drying conditions—for example as well as abovementioned drying pressures, by means of suitable drying temperatures, humidities or similar drying conditions in the interior of the drier setup—is possible for each of one or more different inner regions of the drier setup.

A drier zone defined in this application is thus generally understood to mean a region in the drier setup in which the aqueous polymer gel to be dried is dried, i.e. moisture is withdrawn therefrom, preferably by means of heated drying air. More particularly, a temperature zone is understood to mean a region in the drier setup in which the drying air temperature is adjustable in a substantially independent manner. More particularly, it is at least possible to establish an inlet temperature of the drying air or else air circulation adjustable by internal air heating toward the polymer gel or removal of waste air from the polymer gel substantially independently—apart from unavoidable couplings—from other regions in the drier setup, especially substantially independently of the ambient temperature outside the drier setup.

Such setting of drying temperatures and/or drying pressures and optionally other drying conditions in various drier zones is effected, for example, by means of suitable internals in a periphery of the drier setup, preferably by means of appropriate ventilation constructions. Such internals or add-ons may comprise suitably dimensioned heating registers, heat exchangers, and a drying air supply and withdrawal regime, and ventilators or the like. Drying temperatures and/or drying pressures and optionally other drying conditions include, for example, the air temperatures, air humidities and air pressures of the drying air mentioned. By means of different drying conditions—such as by means of humidity, temperature and pressure in the drier setup and/or adjustable drying times for the aqueous polymer gel to be dried—it is possible to establish the desired degree of final drying for the water-absorbing polymer particles.

It may especially be the case that—in the interior of the drier setup, depending on the air flow regime to the interior and the construction features of a drier zone—different drying pressures can be set up. More particularly, one pressure zone or a number of different pressure zones can be implemented in the interior of the drier setup. A pressure zone may take the form of a whole portion or fraction of an interior of a drier setup in which the pressure can be adjusted. More particularly, the pressure can be set for a pressure zone that extends over at least one or more than one of the drier zones, and is especially restricted thereto. It is thus possible to adjust drying pressures over the pressure zone for one or more drier zones. It is found that this can be utilized as a basis for an advantageous setting of drying conditions. It is also found that this can be utilized as a basis for an advantageous lowering of extraneous particle intake into the drier setup.

More particularly, a pressure zone, more particularly with further narrowing-down of the above proviso, is understood to mean a region, for example a whole portion or fraction, of an interior of a drier setup which is pneumatically delimited from the environment or the rest of the region of an interior of a drier setup such that a pressure therein, within physical limits, is independently adjustable from the environment or from the rest of the region of an interior of a drier setup. In the pressure zone, advantageously, an absolute pressure in line with a countercurrent flow of the drying air, i.e. counter to the conveying direction of the superabsorbent polymer gel, is understood to be a decreasing pressure, preferably within a reduced pressure range below the ambient pressure.

A further starting point is a belt drier of the type specified at the outset according to the preamble of claim 11. The belt drier has a drier setup substantially comprising the conveyor belt, within which the conveyor belt is guided.

What is envisaged is that drying air in the interior of the drier setup can be conducted in countercurrent counter to the conveying direction of the polymer gel and the interior of the drier setup can be kept substantially at a reduced pressure, preferably completely at a reduced pressure, relative to the ambient pressure outside the drier setup. The interior has and/or forms a pressure zone. The interior of the drier setup is preferably divided into a number of pressure zones.

Moreover, in line with conveying direction, a first internal pressure is formed as inlet pressure at a polymer gel inlet in at least one of the pressure zones with a first pressure differential from an ambient pressure and a second internal pressure is formed as outlet pressure at a polymer gel outlet in the at least one pressure zone with a second pressure differential from an ambient pressure. The second pressure differential is smaller than the first pressure differential.

In principle, it has been found to be advantageous that the production process and the belt drier are configured such that the pressure in the drying is predominantly, preferably completely, lower than the atmospheric pressure; in this respect, the belt drier is operated predominantly under reduced pressure, preferably completely under a reduced pressure. In this way, it is also possible to improve drying conditions.

Further advantageously, energy and production efficiency in the operation of a belt drier is supported; this is especially true of an outlet of a drier setup in an end zone, as viewed in conveying direction of the polymer gel—and particularly true of a number of last drier zones in conveying direction of the polymer gel upstream of a discharge module. Preferably, the concept is implemented for a pressure zone implemented in the proximity thereof; especially a pressure zone that extends over a number of last drier zones, and is especially restricted thereto. The intention was to prevent dried particles that arise at the end of the drier setup, especially in an aforementioned discharge module in the drier setup, from the rest of the dry cake material being conveyed as a result of processes including mechanical degradation, being thrown off the deflecting roll or the crushing of the strand or sheet of the dry cake, from being carried into the drier setup. The dried polymer gel in the form of a substantially dried polymer strand is then fed to a crusher at the end of the belt drier. However, even at this stage of breaking off the strand or the sheet, dried polymer particles of dried polymer gel are formed. Some of the dried polymer particles in that case take the form of crushed dried polymer gel, for example comparatively coarse lumps, and some take the form of unavoidable crush residue of dried polymer gel. In particular, the crush residue of dried polymer gel comprises fine polymer particle powder comprising fine and ultrafine particles. The dried polymer gel is thus at least partly already in the form of dried polymer particles even before the crusher or similar comminutor.

Intake of the abovementioned fine dried powder particles comprising fine and ultrafine particles can especially be suppressed or reduced according to the concept with a configuration of a pressure zone in the drier setup in the region of the end zone of the drier setup and upstream of the discharge module, especially for a number of last drier zones upstream of the discharge module. The discharge module is advantageously understood not to form part of the drier setup, since essentially an ambient pressure is established therefor owing to its open configuration, and so a pressure, for example an inlet pressure and/or outlet pressure, cannot be established independently of the ambient pressure for a discharge module.

A contribution for an improved drying process in production of superabsorbent, especially water-absorbing, polymer particles is achievable. In principle, additionally or alternatively, the properties of the dried superabsorbent, especially water-absorbing, polymer particles can be improved. Furthermore, it has been recognized that intake of infiltrated air and/or intake of particles into the interior of a drier setup can be reduced with a suitable configuration of a pressure zone according to the concept in an end zone. More particularly, the concept has been found to be advantageous in the case of a pressure zone that extends over a number of last drier zones, and is especially restricted thereto. Advantageously, this is the case in a drier setup wherein the interior is below atmospheric pressure, i.e. is operated in the reduced pressure range. Incorrect intake of air can lead to a loss of energy and, furthermore, to undefined process conditions to a certain degree. Intake of particles—especially also gas-borne particles by means of entrainment through the intake of infiltrated air into the interior of a drier setup—can lead to shortened maintenance intervals and/or shorter service periods of the plant between maintenance operations.

The interior of the drier setup has and/or forms a pressure zone. It is envisaged that a first internal pressure is formed as inlet pressure at a polymer gel inlet in at least one of the pressure zones with a first pressure differential from an ambient pressure and a second internal pressure is formed as outlet pressure at a polymer gel outlet in the at least one pressure zone with a second pressure differential from an ambient pressure, where the second pressure differential is less than the first pressure differential.

Advantageously, an amount of superabsorbent produced per unit time can be increased by reducing waste products in the drier setup. Continuous operation of the belt drier can be achieved in the context of parameters for the belt drier and/or the polymer gel that are comparatively stable in the long term, especially constant.

It is preferably the case that, in the at least one pressure zone in the interior of the drier setup, the pressure zone or a pressure zone subregion thereof is bounded by means of a transverse wall oriented transverse to the conveying direction of the conveyor belt. For example, one or more transverse walls can divide a pressure zone into one or more pressure zone subregions. To wit, it is possible in principle to establish a slight change in pressure in a pressure zone between the polymer gel inlet thereof and polymer gel outlet thereof; a transverse wall in a pressure zone—i.e. between the polymer gel inlet and the polymer gel outlet in the stream of drying air—nevertheless creates a pressure drop in countercurrent direction C' of the drying air, which, in addition to the slight change in pressure, is manifested as a pressure gradient within a pressure gradient range, i.e. as a pressure stage, pressure ramp or similar additional pressure variation, at the transverse wall. A pressure variation in the pressure zone is thus divided, for example, into a number of pressure section variations distinguishable by a pressure stage, pressure ramp or similar additional pressure variation between the pressure section variations at a transverse wall.

Preferably, in a pressure zone, a pressure profile having at least one pressure gradient region between the polymer gel inlet and the polymer gel outlet of the pressure zone may be formed. More particularly, the pressure gradient region may form a pressure stage, pressure ramp or similar pressure variation. This is a change in pressure in the above sense along a pathway axis in conveying direction of the polymer gel. Preferably, the pressure gradient region can be delimited by means of a transverse wall or adjusted by means of the transverse wall oriented transverse to the conveying direction of the conveyor belt.

Preferably, a number of one or more pressure zones may be formed in the interior of the drier setup. Preferably, in a first variant, one or more pressure zones may extend over at least one or more than one of the drier zones, and especially be restricted thereto. More particularly, the pressure gradient region between the polymer gel inlet and the polymer gel outlet can extend over the at least one or more than one drier zone, especially within an end zone upstream of a discharge module. More particularly, the end zone may also comprise the discharge module. More particularly, the end zone may thus, in a preferred example, be formed by a combination of the last drier zone, optionally also a penultimate drier zone, and the discharge module of the drier setup. An end zone in the present context is thus understood to mean a zone of the drier setup comprising a number of drier zones, but at least the last drier zone upstream of the discharge module; in other words, for example, the last drier zone only or the last drier zone and a penultimate drier zone or the last drier zone and the penultimate drier zone and a further upstream drier zone (counter to conveying direction).

Preferably, a pressure zone with a pressure gradient region between the polymer gel inlet and the polymer gel outlet may extend within a number of last drier zones formed upstream of a discharge module in an end zone of the drier setup. Such a profile of a change in pressure is formed especially in a last drier zone, especially in an end zone upstream of a discharge module.

More particularly, the end zone may also comprise a cooling zone. The last drier zone upstream of the discharge module can advantageously be utilized to allow the water-absorbing polymer particles to cool down and can accordingly be formed even without an enhanced input of heat or with only a small or zero input of heat into the water-absorbing polymer particles; the last drier zone upstream of the discharge module is also referred to in this sense as "cooling zone"; in other words, the cooling zone may be designed to enable a negative input of heat in principle. The last drier zone may, however, in one modification, nevertheless also have heating registers and/or heat exchangers and the like, and hence be designed like previous drier zones. The last drier zone upstream of the discharge module may, however, advantageously be implemented in terms of construction in combination with an aforementioned "cooling zone", in which case the combination is referred to hereinafter as end zone; especially in the case of an end zone with a "cooling zone", it is a feature of the end zone that the dried polymer gel in the form of the water-absorbing polymer particles exits at the same temperature or preferably colder than it enters. For example, it is possible that the dried polymer gel in the form of the water-absorbing polymer particles exits from a last drier zone at a lower temperature, i.e. "colder", than it enters. For example, it is also possible that the dried polymer gel in the form of the water-absorbing polymer particles exits from a penultimate drier zone at a lower temperature, i.e. "colder", than it enters and exits into a last drier zone at the same temperature as it enters.

More particularly, pressures may be adjusted at the edge of a pressure zone, especially at the edge of a drier setup. More particularly, there should advantageously exist only small pressure differentials from the ambient pressure (for instance atmospheric pressure) of the environment, especially the environment outside the drier setup. For instance, advantageously, the second pressure differential in conveying direction of the polymer gel is smaller than the first pressure differential in the region of an end zone of the drier setup upstream of a discharge module.

Preferably, in a second variant, it is also possible for one or more pressure zones to extend within a single one of the drier zones and for the pressure gradient region between the polymer gel inlet and the polymer gel outlet to be restricted to this single drier zone. Preferably, in that case, a pressure zone with a pressure gradient region may extend between the polymer gel inlet and the polymer gel outlet within this single drier zone. For example, the overall drier setup may form a single drier zone; the interior of the drier setup may be designed as a single pressure zone.

Preferably, the interior of the drier setup is kept substantially at a reduced pressure p_U within a region of up to a maximum of −20 mbar, especially up to −10 mbar, especially at a reduced pressure (p_U) of at least −5 mbar, preferably at a reduced pressure (p_U) between −0.5 mbar and −7 mbar or preferably at a reduced pressure between −0.5 mbar and −5 mbar, relative to the ambient pressure outside the drier setup. More particularly, the ambient pressure is an atmospheric pressure outside the drier setup. More particularly, the ambient pressure is an atmospheric pressure essentially outside the drier setup, optionally still within the application and/or discharge module. Preferably, a pressure profile of a pressure variation in the pressure zone, within physical limits, is adjustable independently of an ambient pressure.

A pressure differential from atmospheric pressure is advantageously typically at or close to 0 mbar, preferably at the end of the drier setup. This development relates especially to the "edge of the air drier"; i.e. the edge of the air drier setup bordering the discharge module or the boundary of the last drier zone bordering the discharge module. At the boundary of the drier setup, especially the downstream boundary in this respect, it is possible for infiltrated air to be drawn in. The development proceeds from the consideration that a pressure profile balanced with respect to the ambient pressure, especially atmospheric pressure, reduces an intake of infiltrated air and/or intake of particles, especially by means of a pressure profile gradually matched to a pressure gradient region.

The first and second pressure differentials from ambient pressure may be based on an internal pressure above the conveyor belt, where the internal pressure above the conveyor belt is a reduced pressure in the range of up to −10 mbar, preferably up to −5 mbar. More particularly, an internal pressure beneath the conveyor belt may be lowered with respect to the internal pressure above the conveyor belt by a value between 0.5 mbar and 5 mbar. This proviso has been found to be advantageous if the drying air is introduced into the drier setup at least predominantly, for example by means of an air circulation ventilator, in the downward direction from above the conveyor belt. Even when no new air is being introduced, the "pressure separation" caused by an air circulation ventilator ensures that different pressures exist above and below the conveyor belt. Preferably—again if drying air is being introduced into the drier setup at least predominantly above the conveyor belt—the first and second pressure differentials from the ambient pressure are based on an internal pressure above the conveyor belt, where the first pressure differential from atmospheric pressure is between −10 mbar and −1 mbar, especially between −10 mbar and −0.5 mbar, and the second pressure differential from atmospheric pressure is between −3 mbar and 0 mbar, especially between −2 mbar and 0 mbar, especially between −0.5 mbar and 0 mbar.

A trend which is reversed in principle results when, in a modification, drying air is introduced into the drier setup at least predominantly, for example by means of an air circulation ventilator, in the upward direction from beneath the conveyor belt. If drying air is being introduced into the drier setup predominantly beneath the conveyor belt, the result is correspondingly, conversely and preferably, that an internal pressure above the conveyor belt is lowered by a value between 0.5 mbar and 5 mbar relative to the internal pressure beneath the conveyor belt. It may be advantageous here for the first and second pressure differentials from ambient pressure to be based on an internal pressure beneath the conveyor belt, where the internal pressure beneath the conveyor belt is a reduced pressure in the range of up to −10 mbar, preferably up to −5 mbar. More particularly, the first and second pressure differentials from the ambient pressure may be based on an internal pressure beneath the conveyor belt, where the first pressure differential from atmospheric pressure is between −10 mbar and −1 mbar, especially between −10 mbar and −0.5 mbar, and the second pressure differential from atmospheric pressure is between −3 mbar and 0 mbar, especially between −2 mbar and 0 mbar, especially between −0.5 mbar and 0 mbar.

The pressure profile may be run through in a number of pressure section variations until atmospheric pressure or an approximation of atmospheric pressure has been attained. It has accordingly been found to be particularly advantageous for a pressure zone to have a number of pressure zone subregions, in each of which a pressure section variation is implemented. More particularly, a pressure zone may have a number of abovementioned transverse walls which divide a pressure variation in the pressure zone into pressure section variations.

In a particularly preferred development, a pressure differential between polymer gel inlet and polymer gel outlet of a pressure zone in the drier setup is different. At the polymer gel outlet of a pressure zone in particular, an internal pressure preferably nearly approximates to the atmospheric pressure, in order to reduce an intake of infiltrated air and/or an intake of fine and ultrafine superabsorbent particles by infiltrated air, particularly in the region of an end zone.

More particularly, a pressure profile that approximates to the atmospheric pressure in a stepwise manner with at least one pressure stage has been found to be advantageous. Preferably, the pressure profile extends over the length of a pressure zone, especially a length of a drier zone if the pressure zone is restricted to a drier zone. This allows a pressure stage with comparatively high pressure amplitude at the polymer gel outlet of the pressure zone to be avoided, or a pressure amplitude to be reduced. Reduced intake of infiltrated air improves the energy efficiency and reduces intake of fine and ultrafine superabsorbent particles into the drier setup of the belt drier or into the interior of the air drier setup through entrainment of particles.

A pressure profile has a pressure gradient between the polymer gel inlet and the polymer gel outlet of a pressure zone, and is designed or is established according to the pressure conditions at the polymer gel inlet and the polymer gel outlet. The pressure zone here forms a region of an interior of a drier setup which is adjustable for pressure-related purposes. In respect of the latter, with regard to specific settings, the defined process parameters can be complied with and it is nevertheless possible to counteract the intake of superabsorbent particles and fine and ultrafine particles, especially with infiltrated air.

Preferably, a setting of reduced pressure in the drier setup of the belt drier can be implemented, namely advantageously with a drying air flow regime in countercurrent.

For drying, it is preferably the case that an air withdrawal conduit connected to the drier setup for air recycling and an air recycling conduit connected to the drier setup for air supply, the latter being connected to the air withdrawal conduit, especially via internals, wherein recycled air is withdrawn from the drier setup, especially from an end zone (EZ), and fed back to the drier setup, especially to a drier zone upstream of an end zone (EZ) via the air recycling conduit, wherein an air withdrawal conduit and/or air recycling conduit is connected to a pressure zone for flow purposes, especially opens into a pressure zone via an air-guiding orifice.

Additionally or alternatively, it has been found to be advantageous that waste air from the drier setup is removed at least partly in an air removal conduit, wherein the air removal conduit opens into a pressure zone via a further air-guiding orifice.

Additionally or alternatively, it has been found to be advantageous for the belt drier to take the form of an air circulation belt drier operated with circulating air and which, to guide circulating air, takes the form of a drier setup substantially comprising the conveyor belt, in which the drying air is circulated as circulating air in a drying zone (TZ) as circulating air (UL), especially transverse to countercurrent direction (C').

Preferably, it is thus possible to additionally implement air circulation operation in the drier setup of the air circulation belt drier; namely further preferably in cross-countercurrent, i.e. additionally with utilization of circulating air transverse to the countercurrent flow. Circulating air may be guided, for example, from above and/or below through the conveyor belt and through the polymer gel lying thereon, i.e. transverse to and through the polymer gel stream, for example as described in WO 2006/100300 A1. The development has recognized that it is nevertheless advantageous to provide one or more pressure zones, especially to adjust a pressure in a pressure zone according to the concept.

Preferably, an air circulation conduit and/or air recycling conduit and/or air removal conduit is provided. Preferably, a pressure profile thereof is established only in an end region to the polymer gel outlet of a pressure zone, especially drier zone, in order to reduce an intake of fine and ultrafine superabsorbent particles into the drier setup and hence to distinctly reduce cleaning and maintenance operations. More particularly, a particularly preferred development, furthermore, has recognized that, within an abovementioned controllable region of the drier setup, it is possible to establish a drying profile, namely with optionally adjusted temperatures, pressures, moisture outputs, the settings for the air recycling system and the like.

In the case of a pressure profile, for example with a pressure gradient range, a pressure differential at the polymer gel inlet and/or polymer gel outlet of a pressure zone should be reduced here to such an extent that the internal pressure of the pressure zone is increasingly matched to an ambient pressure, especially atmospheric pressure. Preferably, the pressure zone has at least one throttle at a polymer gel inlet of the pressure zone and at least one throttle at a polymer gel outlet of the pressure zone. A pressure profile is adjustable with regard to a pressure zone merely via the feed air and/or waste air, or is adjustable via throttle-controllable feeds of air or removals of air. Preferably, a pressure profile of a pressure variation in the pressure zone is established independently of ambient pressure, and/or the pressure profile forms through a setting of a valve or throttle. More particularly, an input setting of an input throttle or input valve at a polymer gel inlet to a pressure zone and/or an output setting of an output throttle or output valve at the polymer gel outlet to a pressure zone can determine a pressure profile.

Particularly preferred design measures in a drier setup are elucidated hereinafter.

Preferably, the belt drier takes the form of a modular belt drier having an input module, a drier module and a discharge module, wherein at least the interior of the drier setup is assigned a number of pressure zones. More preferably, in a first variant, the interior of the drier setup can be divided into a number of pressure zones, where a pressure zone extends over at least one or more than one of the drier zones. More preferably, in a second variant, the interior of a drier zone may be divided into a number of pressure zones, such that the interior of the drier setup is also divided into a number of pressure zones. A drier setup may be formed in modular form by a number of drier zones.

In a discharge module, as elucidated above, relatively large amounts of superabsorbent particles and fine and ultrafine particles can arise as a result of the dried strand of polymer gel being thrown off the belt and crushed. It is found that, advantageously, an adjustment of the pressures at the edge of a pressure zone, according to the concept, reduces uncontrolled intake of particles and/or intake of infiltrated air at a start or end zone into the interior of the drier setup. Especially in a start zone, uncontrolled intake of infiltrated air brought about as a result of a pressure differential from the intake module into the interior of the drier setup should be reduced; this leads to better energy efficiency of the process, since reduced intake of infiltrated air also means less intake of cold air that would have to be partly compensated for in terms of energy and leads in part, as a short-circuit stream, merely to elevated air throughput with elevated energy input, and cold air if anything cools the hot polymer gel down and hence reduces the drying rate of the material. The concept of the developments surprisingly starts with considerations that are to be considered not just in a polymer gel-specific manner. Advantageously, over and above a drying process, additional process-related relevant parameters in the cleaning and maintenance operations are also taken into account.

It has advantageously been recognized that, in order to reduce cleaning and maintenance operations within the belt drier, the accumulation of superabsorbent particles and fine and ultrafine particles or other particles within the plant should be very substantially avoided, but at least reduced, in one or more of the aforementioned developments. Overall, a higher process yield and/or with lower energy demands is to be achieved. In this respect, the advantage is found that deviation from particularly optimized process parameters is minimized or the frequency of a need to deviate is reduced according to one or more of the aforementioned developments. It is advantageously the case that the production process for especially continuous production of water-absorbing polymer particles is specifically improved in terms of the drying step, or the belt drier is improved by specific construction measures for the drier module.

It is preferable that, in the at least one pressure zone in the interior of the drier setup, the pressure zone or a pressure zone subregion thereof is bounded by means of a transverse wall oriented transverse to the conveying direction of the conveyor belt, and a pressure gradient region can especially be formed by means of the transverse wall. More particularly, a pressure zone has a pressure zone boundary, a polymer gel inlet and/or a polymer gel outlet, wherein the pressure zone boundary is formed by means of a transverse wall in the interior of the drier setup, wherein the transverse wall is oriented transverse to the conveying direction of the conveyor belt and is secured to the drier setup.

It may preferably also be the case that a pressure zone has a pressure zone boundary, wherein the pressure zone boundary is formed by means of a transverse outer wall at an air-guiding orifice and is secured to the drier setup, especially to a drier zone.

Preferably, a pressure zone has a transverse inner wall within the pressure zone between a polymer gel inlet and a polymer gel outlet for formation of a pressure gradient region; the transverse inner wall is especially formed in addition to a transverse outer wall of a pressure zone.

Construction measures, especially in the region of an end zone of the drier setup, may be executed essentially such that, compared to the situation at a polymer gel inlet, the pressure differential from an ambient pressure at a polymer gel outlet of a pressure zone, especially a drier zone, is comparatively low.

A preferred further development envisages that the end zone has a last drier zone of the setup of the belt drier. Preferably, the pressure profile develops in an end zone comprising a last drier zone, especially in a last drier zone. An end zone comprises a last drier zone, especially multiple drier zones, especially also the discharge module. A problem is that the intake of fine and ultrafine superabsorbent particles by infiltrated air can especially take place from the discharge module into the last drier zone, since the discharge module directly adjoins the last drying module. Because of a comparatively small pressure differential, according to the development, introduction of infiltrated air fine and ultrafine superabsorbent particles can be reduced. It is advantageously possible with the concept of the development to adjust the pressure profile in the end zone comprising a last drier zone, especially in the last drier zone, in such a way that an atmospheric pressure or a near approximation of atmospheric pressure can be established at the drier zone outlet (i.e. in conveying direction C of the polymer gel at the outlet for the polymer gel from the drier zone).

More particularly, a transverse wall is provided in the interior of the drier setup, oriented transverse to the conveying direction of the conveyor belt and having at least one segmenting element. Preferably, a transverse wall comprises, in the interior of the drier setup, an upper segmenting element above the conveyor belt and/or a lower segmenting element beneath the conveyor belt and/or a middle segmenting element between a part of the conveyor belt that runs in conveying direction and a part of the conveyor belt that runs counter to conveying direction.

More particularly, it is the case that the pressure profile in an end zone comprising a last drier zone is formed by means of one transverse wall of a number of transverse walls, especially comprising segmenting elements, for additional spatial division. The development of the belt drier envisages formation of a pressure profile by at least one segmenting element owing to an additional spatial division. In this development, the segmenting element achieves a pressure differential or a pressure profile between a first region and a second region of a pressure zone. Advantageously, this minimizes the intake of infiltrated air through the establishment of a minimum pressure differential from the environment at the polymer gel outlet of the end zone.

A segmenting element preferably takes the form of a part of the transverse wall that causes a difference in pressure. However, a segmenting element is in principle not restricted in terms of its size and shape; in principle, a segmenting element may have various configurations. The segmenting element may in principle have a partly open configuration. For example, the structure of the segmenting element may comprise that of a perforated metal sheet or of a grid or of a pendulum sheet. A number of segmenting elements may take the form, for example, of metal sheets.

More particularly, an upper segmenting element may be in one-piece form and/or be formed with pendulum sheets. More particularly, at least one upper segmenting element may be height-adjustable.

A segmenting element may be mounted on a wall, i.e. on one or more side walls and/or roofs, of a drier setup of the drier module. More particularly, a segmenting element may be suspended from above. It may be configured in a fixed mode of incorporation or in a loose mode of incorporation. More particularly, the segmenting element may be firmly attached to the side wall.

Mounting of the segmenting element is likewise unrestricted in principle. In principle, any manner of attachment or form that can cause a difference in pressure is suitable. The segmenting element may be arranged, for example, above or beneath the belt; if necessary, according to the belt recycling, it may also be arranged between an advancing and reversing part of the belt.

A segmenting element may be in one-piece form or segmented. It may be introduced in one-piece form as a one-piece segmenting element similarly to metal sheets. It may alternatively be constructed from multiple pieces as a segmented segmenting element, but these are fixed and immobile or only slightly mobile or else in the form of fixed, non-pendulum sheets. For example, in a preferred modification, may also be formed from multiple pieces and one or more pieces may oscillate, such that the segmenting element is formed with pendulum sheets. The segmenting element may be variable in operation in terms of its segmented and/or pendulum construction. In the form of a fixed, non-pendulum sheet, it may also be provided with additional pendulum sheets or may already oscillate on its suspension mount and hence take the form of a pendulum sheet overall. It should be noted here that a polymer gel applied to the conveyor belt should not be impaired by the incorporation of a segmenting element, should especially as far as possible not be subjected to any mechanical pressure, and should preferably come into contact only to a minor degree, if at all, with the segmenting element(s).

It is preferably the case that, in the pressure zone, especially in the drier zone, the pressure profile is formed by a throttle-controllable volume flow rate of feed air at the polymer gel inlet of the pressure zone and a throttle-controllable volume flow rate of waste air at the polymer gel outlet of the pressure zone. In this case, setting of the volume flow rates should define a corresponding pressure level at the polymer gel inlet, in order thus to form a suitable pressure profile for a pressure zone.

One development envisages forming a pressure profile in the pressure zone in the region of the end zone, where the second pressure differential from atmospheric pressure at a polymer gel outlet (i.e. in conveying direction C of the polymer gel at the outlet for the polymer gel from the pressure zone) in absolute terms is between −2 mbar and 0 mbar, more preferably between −1 mbar and 0 mbar. The development has recognized that a defined value for a differential of −2 mbar to 0 mbar, but especially −1 mbar to 0 mbar, from atmospheric pressure is advantageously sufficient to reduce the intake of superabsorbent particles and fine and ultrafine particles or other particles and/or intake of infiltrated air in the region of an end zone and/or application zone.

The segmenting element may be adjustable in terms of height for formation of a pressure profile, for example with not less than 30 cm of clearance to the polymer gel surface, preferably with not less than 20 cm from the polymer gel surface, very preferably with not less than 10 cm from the polymer gel surface, if fixed, non-mobile segmenting elements are being used. If moving segmenting elements, for example pendulum sheets, are being used, the clearance from the polymer gel surface may preferably be 0 cm. Mounting of the segmenting element is advantageous particularly above the belt, since the greatest volume flow rate of the circulated air and simultaneously the greatest volume of air are available here. Preferably, the segmenting element is installed above the belt and/or below the belt and or, if appropriate, between the parts of the belt. By means of an advantageous development to the effect that the segmenting element is installed above the belt and beneath the belt and between the parts of the belt, it is easier to reduce a pressure differential at the polymer gel outlet of a pressure zone. More particularly, in terms of the process, the aqueous polymer gel mass to be conveyed can be changed in terms of its thickness; depending on this, it is preferably possible to adjust the height of the segmenting element over the polymer gel layer on the conveyor belt in relation to a polymer gel application.

The concept can especially be implemented with a production process comprising the steps of:
processing a monomer solution or suspension with polymerization to give an aqueous polymer gel,
drying the aqueous polymer gel in a belt drier, where the belt drier has a circulating transport belt and the aqueous polymer gel is conveyed on the transport belt. It is preferably the case here that
the transport belt takes the form of a plate conveyor belt having a number of belt plates separated on an articulated line of an articulated construction, and wherein each belt plate has a surface for accommodating the aqueous polymer gel.

More particularly, this production process may comprise: processing a monomer solution or suspension with polymerization to give a crosslinked aqueous polymer gel.

In the context of a particularly advantageous development, it has been recognized that the concept is particularly advantageous for a specific production process for superabsorbents, which is described hereinafter with a few developments and is partly also elucidated in WO 2006/100300 A1, the disclosure content of which is hereby incorporated by reference into the disclosure content of the present application.

More particularly, this relates to a production process for producing water-absorbing polymer particles by polymerization of a monomer solution or suspension comprising
a) at least one ethylenically unsaturated monomer which bears acid groups and may have been at least partly neutralized,
b) at least one crosslinker,
c) at least one initiator,
d) optionally one or more ethylenically unsaturated monomers copolymerizable with the monomers mentioned under a) and
optionally one or more water-soluble polymers.

The water-absorbing polymer particles are produced by polymerization of a monomer solution or suspension and are typically water-insoluble.

The monomers a) are preferably water-soluble, i.e. their solubility in water at 23° C. is typically at least 1 g/100 g of water, preferably at least 5 g/100 g of water, more preferably at least 25 g/100 g of water and most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid or methacrylic acid and/or salts thereof. Very particular preference is given to acrylic acid and/or salts thereof.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, an acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05% to 1.5% by weight, more preferably 0.1% to 1% by weight, most preferably 0.2% to 0.5% by weight, based in each case on monomer a). With rising crosslinker content, centrifuge retention capacity (CRC) falls and the absorption under a pressure of 21.0 g/cm$^2$ passes through a maximum.

Initiators c) used may be all compounds which generate free radicals under the polymerization conditions, for example thermal initiators, redox initiators or photoinitiators.

Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methyl cellulose or hydroxyethyl cellulose, gelatin, polyglycols or polyacrylic acids, preferably starch, starch derivatives and modified cellulose.

Typically, an aqueous monomer solution is used. The water content of the monomer solution is preferably from 40% to 75% by weight, more preferably from 45% to 70% by weight and most preferably from 50% to 65% by weight. It is also possible to use monomer suspensions, i.e. monomer solutions with excess monomer a), for example sodium acrylate. As the water content rises, the energy expenditure in the subsequent drying rises and, as the water content falls, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on a belt is described, for example, in DE 38 25 366 A1 and U.S. Pat. No. 6,241,928. Polymerization in a belt reactor forms a polymer gel which has to be comminuted in a further process step, for example in an extruder or kneader.

To improve the drying properties, the comminuted polymer gel obtained by means of a kneader can additionally be extruded.

However, it is also possible to dropletize an aqueous monomer solution and to polymerize the droplets obtained in a heated carrier gas stream. It is possible here to combine the process steps of polymerization and drying, as described in WO 2008/040715 A2, WO 2008/052971 A1 and WO 2011/026876 A1.

The acid groups of the resulting polymer gels have typically been partly neutralized. Neutralization is preferably carried out at the monomer stage. This is typically accomplished by mixing in the neutralizing agent as an aqueous solution or else preferably as a solid. The degree of neutralization is preferably from 25 to 95 mol %, more preferably from 30 to 80 mol % and most preferably from 40 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the aqueous polymer gel formed in the polymerization. It is also possible to neutralize up to 40 mol %, preferably from 10 to 30 mol % and more preferably from 15 to 25 mol % of the acid groups prior to the polymerization by adding a portion of the neutralizing agent actually to the monomer solution and setting the desired final degree of neutralization only after the polymerization, at the aqueous polymer gel stage. When the aqueous polymer gel is neutralized at least partly after the polymerization, the aqueous polymer gel is preferably comminuted mechanically, for example by means of an extruder, in which case the neutralizing agent can be sprayed, sprinkled or poured on and then carefully mixed in. For this purpose, the aqueous gel material obtained can be extruded several times more for homogenization.

The aqueous polymer gel is then preferably dried with a belt drier until a desired, preferably low, water content is established, especially in that a residual moisture content preferably is 0.5% to 15% by weight, more preferably 1% to 10% by weight and most preferably 2% to 8% by weight, the residual moisture content being determined by EDANA recommended test method No. WSP 230.2-05 "Mass Loss Upon Heating". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the aqueous polymer gel before the drying is preferably from 25 and 90% by weight, more preferably from 35 to 70% by weight and most preferably from 40 to 60% by weight. However, a fluidized bed drier or a paddle drier may optionally also be used for drying purposes.

Thereafter, the dried polymer gel is ground and classified, and the apparatus used for grinding may typically be single or multistage roll mills, preferably two- or three-stage roll mills, pin mills, hammer mills or vibratory mills.

The mean particle size of the superabsorbent polymer particles removed as ground polymer particles is preferably at least 200 μm, more preferably from 250 to 600 μm and very particularly from 300 to 500 μm. The mean particle size of the polymer particles may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which arises for a cumulative 50% by weight.

The proportion of polymer particles having a particle size of greater than 150 μm is preferably at least 90% by weight, more preferably at least 95% by weight, most preferably at least 98% by weight.

Polymer particles with too small a particle size lower the permeability (SFC). The proportion of excessively small polymer particles ("fines") should therefore be small.

Excessively small polymer particles are therefore typically removed and recycled into the process. The recycling is preferably done before, during or immediately after the polymerization, i.e. before the drying of the aqueous polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

If a kneading reactor is used for polymerization, the excessively small polymer particles are preferably added in the last third of the kneading reactor.

If the excessively small polymer particles are added at a very early stage, for example actually to the monomer solution, this lowers the centrifuge retention capacity (CRC) of the resulting water-absorbing polymer particles. However, this can be compensated, for example, by adjusting the amount of crosslinker b) used. The excessively small polymer particles can also be added at a later stage, but could then possibly be incorporated only inadequately.

Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 µm is preferably at least 90% by weight, more preferably at least 95% by weight, most preferably at least 98% by weight.

The proportion of particles having a particle size of at most 600 µm is preferably at least 90% by weight, more preferably at least 95% by weight, most preferably at least 98% by weight.

Polymer particles with too great a particle size lower the swell rate. The proportion of excessively large polymer particles should therefore likewise be low.

Excessively large polymer particles are therefore typically removed and recycled into the grinding of the dried polymer gel.

To further improve the properties, the polymer particles can be surface postcrosslinked. Suitable surface postcrosslinkers are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers are cyclic carbonates in DE 40 20 780 C1, 2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amido acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyl-2-oxazolidinone, 2-oxazolidinone and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001% to 5% by weight, more preferably 0.02% to 2% by weight and most preferably 0.05% to 1% by weight, based in each case on the polymer particles.

In a preferred embodiment, polyvalent cations are applied to the particle surface in addition to the surface postcrosslinkers before, during or after the surface postcrosslinking.

The polyvalent cations usable in the production process are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are hydroxide, chloride, bromide, sulfate, hydrogensulfate, carbonate, hydrogencarbonate, nitrate, phosphate, hydrogenphosphate, dihydrogenphosphate and carboxylate, such as acetate, citrate and lactate. Salts with different counterions are also possible, for example basic aluminum salts such as aluminum monoacetate or aluminum monolactate. Aluminum sulfate, aluminum monoacetate and aluminum lactate are preferred. Apart from metal salts, it is also possible to use polyamines as polyvalent cations.

The amount of polyvalent cation used is, for example, 0.001% to 1% by weight, preferably 0.005% to 0.5% by weight and more preferably 0.02% to 0.2% by weight, based in each case on the polymer particles.

The surface postcrosslinking is typically performed in such a way that a solution of the surface postcrosslinker is sprayed onto the dried, ground and sieved polymer particles. After the spray application, the polymer particles coated with surface postcrosslinker are dried thermally, and the surface postcrosslinking reaction can take place either before or during the drying.

The spray application of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting characteristics and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The thermal drying is preferably carried out in contact driers, more preferably paddle driers, most preferably disk driers. Suitable driers are, for example, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany), Holo-Flite® driers (Metso Minerals Industries Inc.; Danville; USA) and Nara Paddle Dryer (NARA Machinery Europe; Frechen; Germany). Moreover, fluidized bed driers may also be used.

The drying can be effected in the mixer itself, by heating the jacket or blowing in warm air. Equally suitable is a downstream drier, for example a shelf drier, a rotary tube oven or a heatable screw. It is particularly advantageous to mix and dry in a fluidized bed drier.

Preferred drying temperatures are in the range of 100 to 250° C., preferably 120 to 220° C., more preferably 130 to 210° C. and most preferably 150 to 200° C. The preferred residence time at this temperature in the reaction mixer or dryer is preferably at least 10 minutes, more preferably at least 20 minutes, most preferably at least 30 minutes, and typically at most 60 minutes.

In a preferred embodiment, the surface postcrosslinked water-absorbing polymer particles are cooled after the drying. The cooling is preferably performed in contact coolers, more preferably paddle coolers and most preferably disk coolers. Suitable coolers are, for example, Hosokawa Bepex® Horizontal Paddle Cooler (Hosokawa Micron GmbH; Leingarten; Germany), Hosokawa Bepex® Disc Cooler (Hosokawa Micron GmbH; Leingarten; Germany), Holo-Flite® coolers (Metso Minerals Industries Inc.; Danville; USA) and Nara Paddle Cooler (NARA Machinery Europe; Frechen; Germany). Moreover, fluidized bed coolers may also be used.

In the cooler, the surface postcrosslinked water-absorbing polymer particles are cooled to 20 to 150° C., preferably 30 to 120° C., more preferably 40 to 100° C. and most preferably 50 to 80° C.

Subsequently, the surface postcrosslinked, water-absorbing polymer particles can be classified again, excessively small and/or excessively large polymer particles being removed and recycled into the process.

For further improvement of the properties, the surface postcrosslinked water-absorbing polymer particles can be coated and/or remoisturized, especially coated with additives or other coatings and/or remoisturized with water.

The remoisturizing is preferably performed at 30 to 80° C., more preferably at 35 to 70° C., most preferably at 40 to 60° C. At excessively low temperatures, the surface postcrosslinked water-absorbing polymer particles tend to form lumps, and, at higher temperatures, water already evaporates to a noticeable degree. The amount of water used for remoisturizing is preferably from 1% to 10% by weight, more preferably from 2% to 8% by weight and most preferably from 3% to 5% by weight, based in each case on the surface postcrosslinked water-absorbing polymer particles. The remoisturizing increases the mechanical stability of the polymer particles and reduces their tendency to static charging. The remoisturizing is advantageously performed in the cooler after the thermal drying.

Suitable coatings for improving the swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired packing tendency of the polymer particles are, for example, fumed silica, such as Aerosil® 200, and surfactants, such as Span® 20.

The surface postcrosslinked water-absorbing polymer particles produced by the production process have a moisture content of preferably 0% to 15% by weight, more preferably 0.2% to 10% by weight and most preferably 0.5% to 8% by weight, the moisture content being determined by EDANA recommended test method No. WSP 230.2-05 "Mass Loss Upon Heating".

The surface postcrosslinked water-absorbing polymer particles produced by the production process have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the surface postcrosslinked water-absorbing polymer particles is typically less than 60 g/g. The centrifuge retention capacity (CRC) is determined by EDANA recommended test method No. WSP 241.2-05 "Fluid Retention Capacity in Saline, After Centrifugation".

The surface postcrosslinked water-absorbing polymer particles produced by the production process have an absorption under a pressure of 49.2 g/cm² of typically at least 15 g/g, preferably at least 20 g/g, more preferably at least 22 g/g, especially preferably at least 24 g/g and most preferably at least 26 g/g. The absorption under a pressure of 49.2 g/cm² of the surface postcrosslinked water-absorbing polymer particles is typically less than 35 g/g. The absorption under a pressure of 49.2 g/cm² is determined analogously to EDANA recommended test method No. WSP 242.2-05 "Absorption Under Pressure, Gravimetric Determination", except that a pressure of 49.2 g/cm² is established instead of a pressure of 21.0 g/cm².

Working examples of the invention are now described hereinafter with reference to the drawing. This is not necessarily intended to represent the working examples in a crucial manner; instead, the drawing, serving for elucidation, is executed in schematic and/or slightly distorted form. With regard to additions of the teachings immediately apparent from the drawings, reference is made to the relevant prior art. It should be taken into account here that various multiplications and alterations relating to the form and the detail of an embodiment can be undertaken without departing from the general idea and the concept of the invention. The features of the invention disclosed in the description, in the drawings and in the claims may be essential to the development of the invention either individually or in any combination. Moreover, the scope of the invention includes all combinations of at least two of the features disclosed in the description, the drawings and/or the claims. The general idea and the concept of the invention is not restricted to the exact form or the detail of the embodiments shown and described hereinafter, or restricted to subject matter that would be limited compared to the subject matter claimed in the claims. In the case that ranges of dimensions are given, values within the limits mentioned shall also be disclosed with limiting values and shall be usable and implementable as desired. Further advantages, features and details of the invention will be apparent from the description of the preferred working examples which follows and from the drawing.

Figure 2:
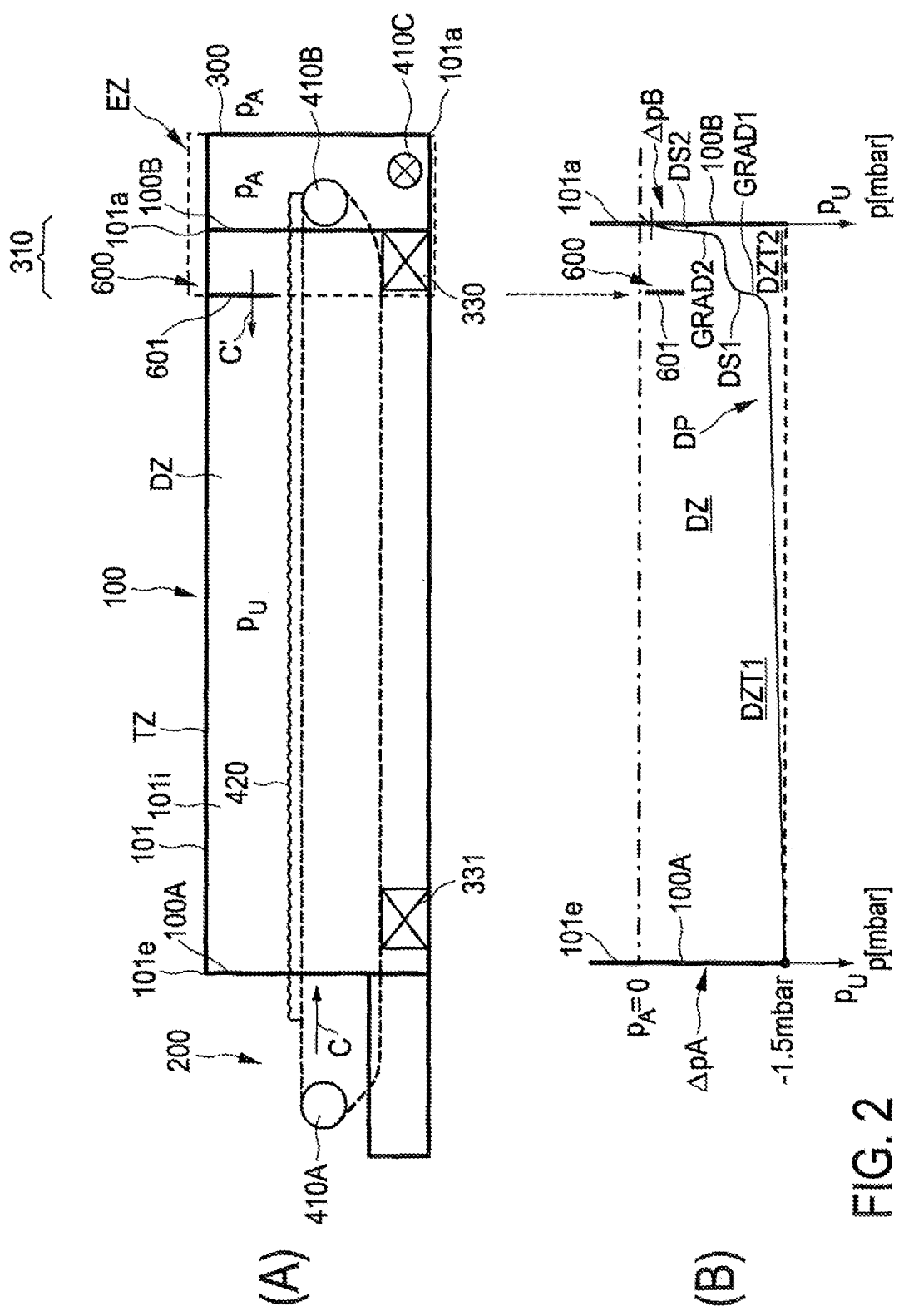
Figure 3:
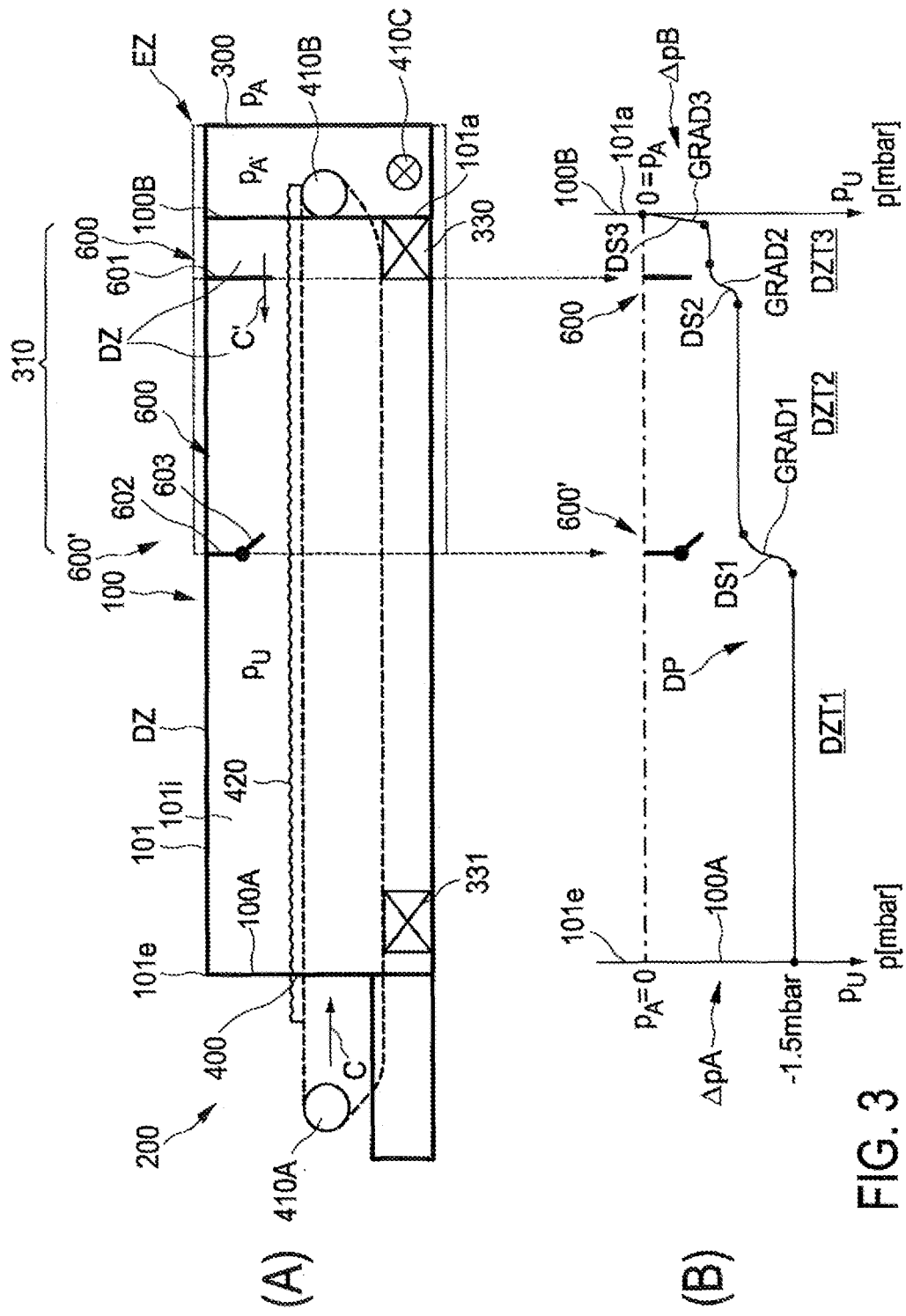
Figure 4:
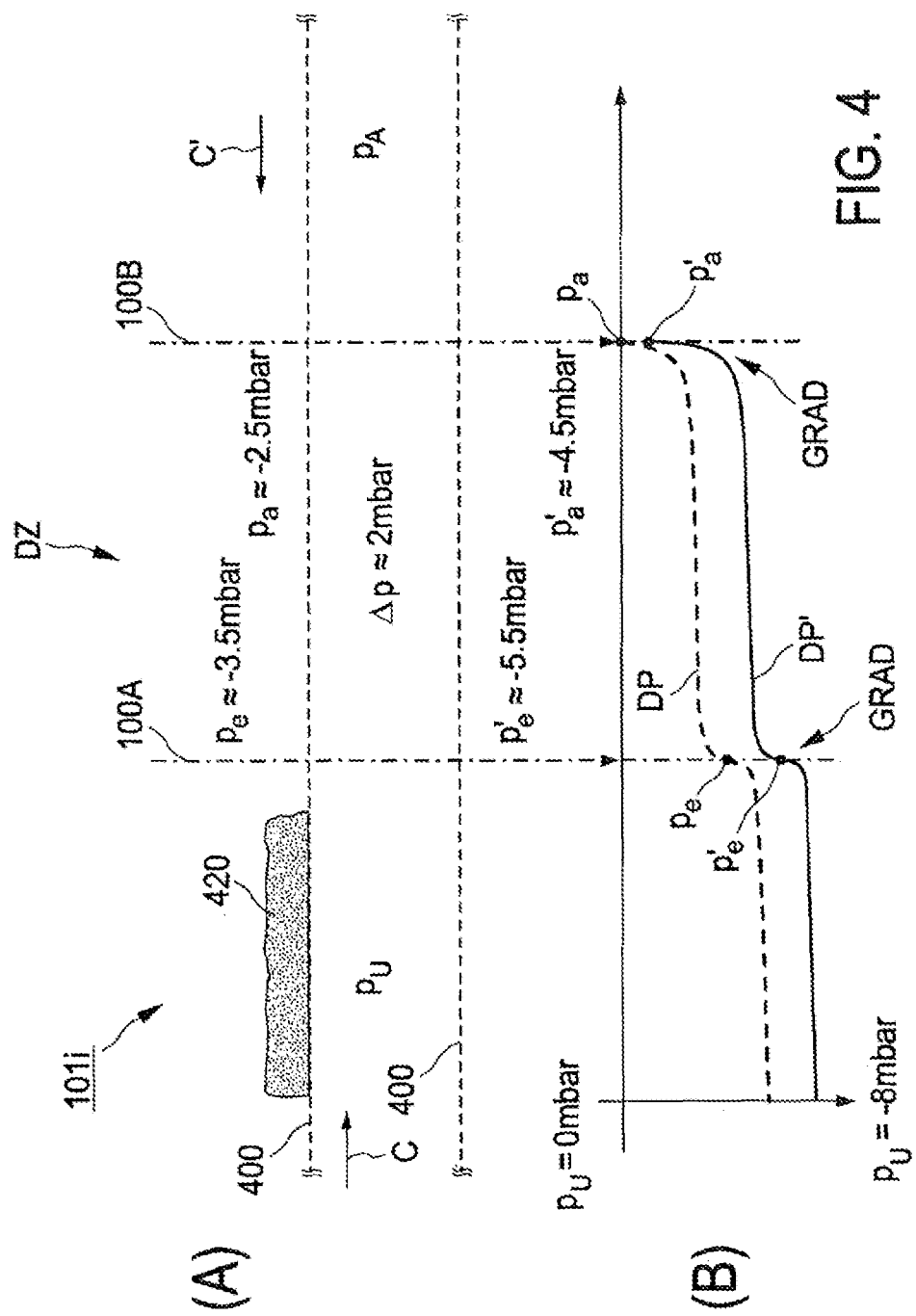
Figure 5:
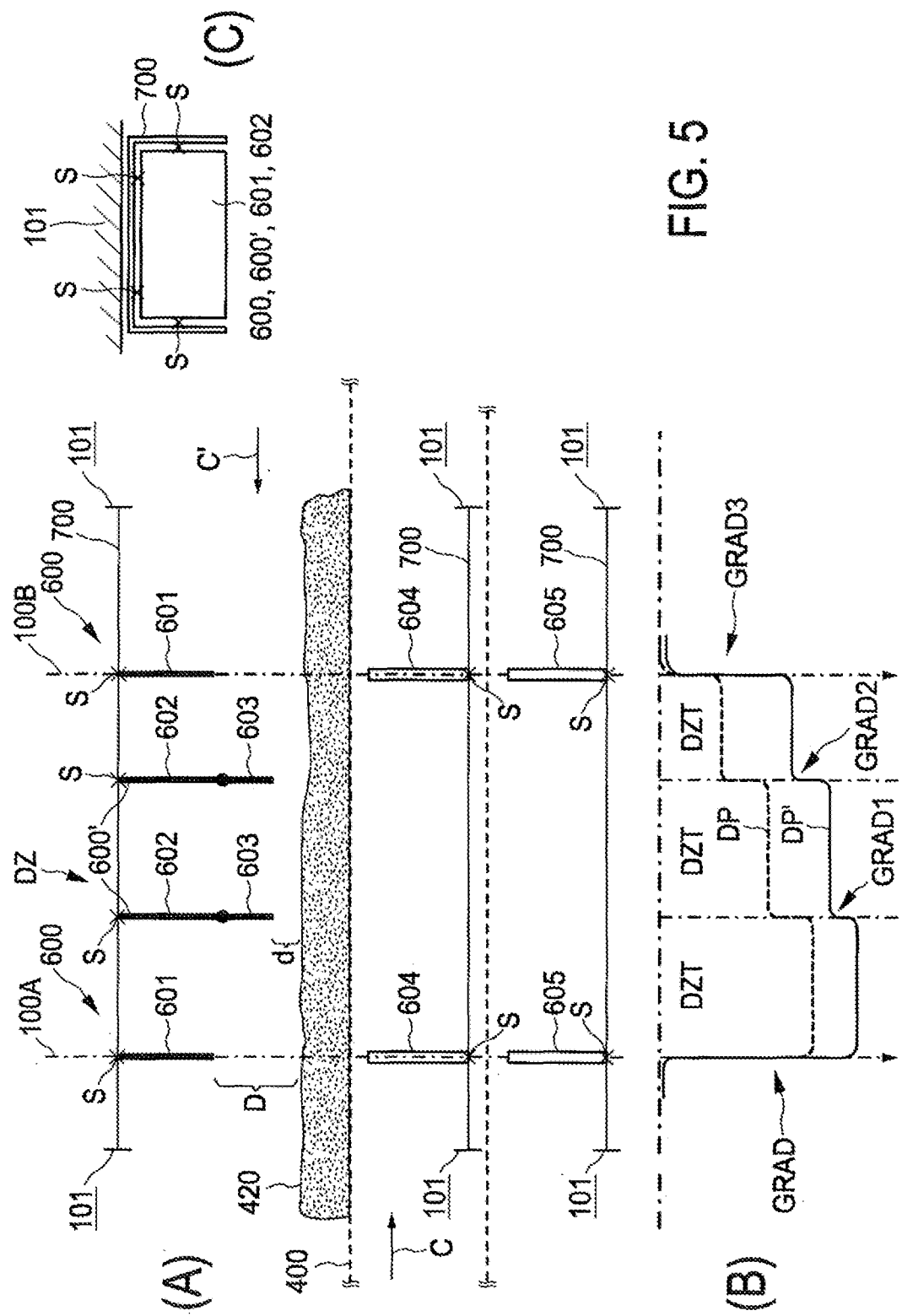
Figure 6:
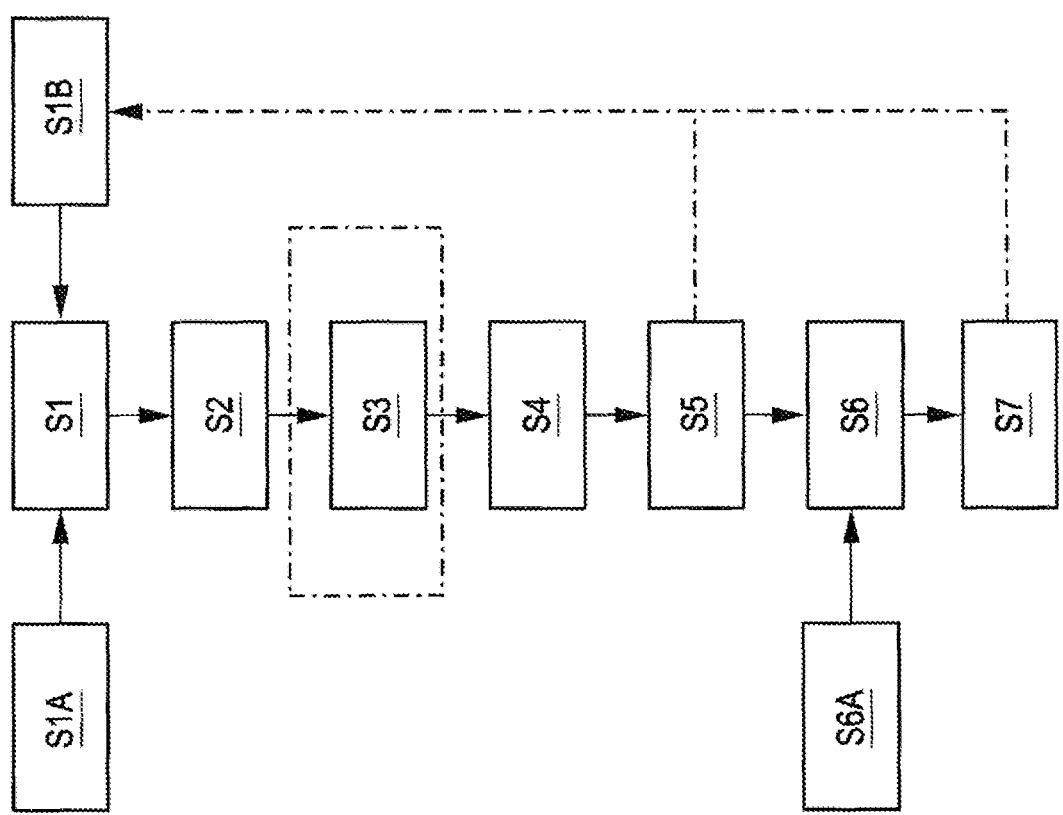
Figure 7:
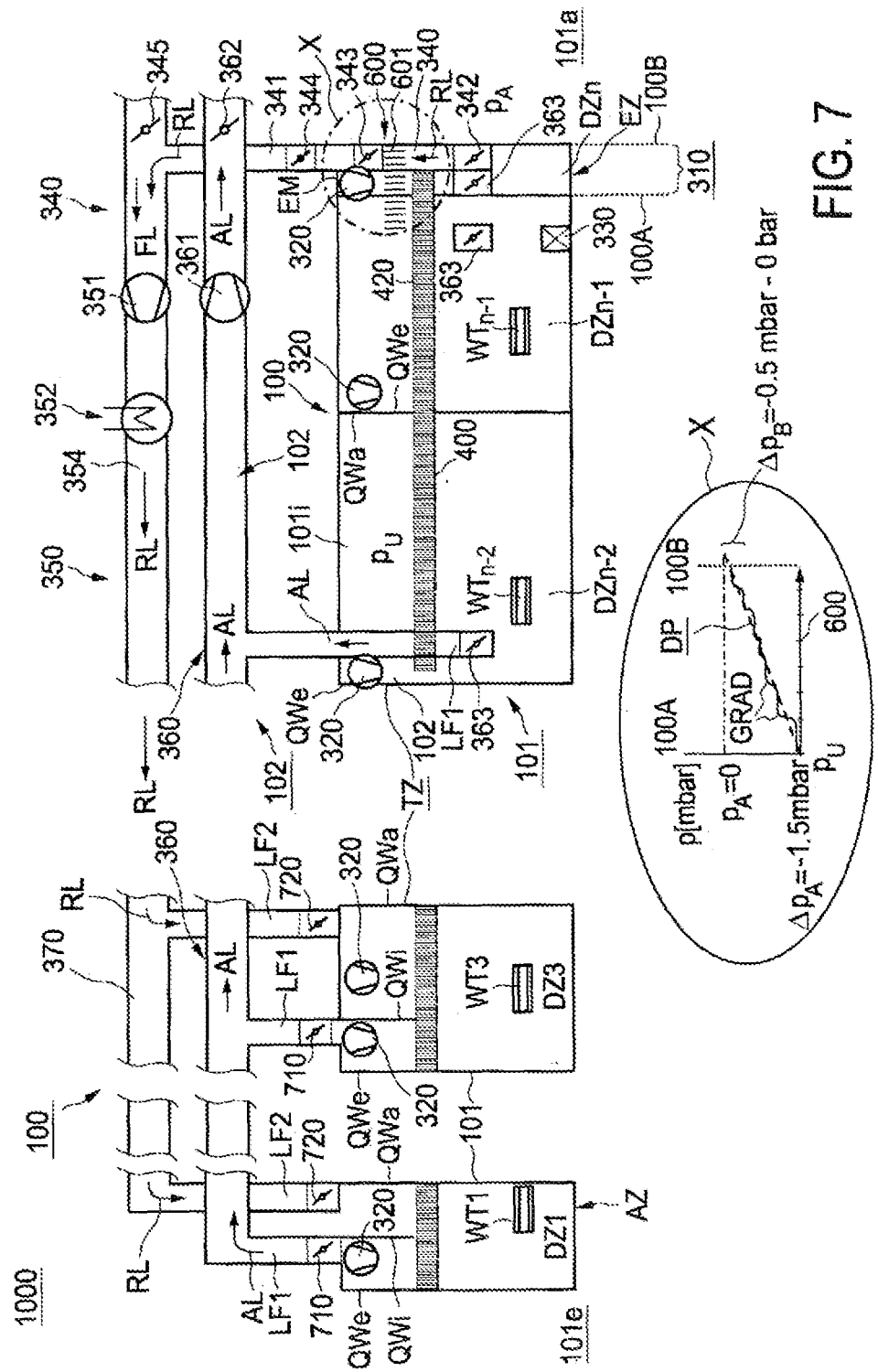

The specific drawings show:

FIG. 1 a schematic diagram of a belt drier, here in the form of a first air circulation belt drier, in a particularly preferred first embodiment in a section in line with conveying direction C and in line with the direction of countercurrent flow C';

FIG. 2 in (A) a schematic diagram of a belt drier with a first pressure profile established shown in (B) in symbolic form, not to scale;

FIG. 3 in (A) a schematic diagram of a belt drier with a second pressure profile established shown in (B) in symbolic form, not to scale;

FIG. 4 in (A) an example of a pressure situation in a pressure zone above and beneath the conveyor belt in a belt drier with a third pressure profile established shown in (B) in symbolic form, not to scale;

FIG. 5 in (A) a schematic diagram of a belt drier with an illustrative execution of transverse walls for delimitation of a pressure zone and for representation of a pressure gradient range in a pressure zone with, in (B), a fourth pressure profile established shown in symbolic form, not to scale, and, in (C), a front view of a transverse wall with frame;

FIG. 6 a particularly preferred embodiment of a production process with reference to a schematic flow diagram;

FIG. 7 a schematic diagram of a belt drier in a further particularly preferred embodiment in a section in line with conveying direction C and in line with countercurrent direction C' and, in (X), with a detailed diagram of a possible pressure gradient variation shown in symbolic form, not to scale.

In FIG. 1 to FIG. 7, for the sake of simplicity, identical reference numerals have been utilized for identical or similar parts or parts of identical or similar function.

FIG. 1 shows, in principle, a belt drier 1000, here in the form of an air circulation belt drier, in modular construction in this embodiment by way of example with a number of drier zones TZ. The belt drier 1000 has an input module 200, a drier module 100 with a drier setup 101 having multiple drier zones TZ—referred to here as 110, 120, 130, 140, 150, 160, 170—and a discharge module 300; the input module 200 and the discharge module 300 are described in the present context as not forming part of the drier setup 101.

The belt drier 1000 is configured for polymer gel treatment, wherein the aqueous polymer gel 420 is applied continuously and very substantially homogeneously to a horizontal conveyor belt 400 in the input module 200 and then passes through the drier module 100—via the interior 101i of the drier setup 101—in conveying direction C on the conveyor belt 400. The belt drier 1000 takes the form of what is called a one-stage drier. A belt drier of this kind, in a modification which is not shown here, but in an otherwise analogous manner, may also take the form of a multistage drier or a multilevel or multibelt drier.

In the belt drier 1000 shown in FIG. 1, drying air is conducted in a countercurrent direction C' counter to the conveying direction C, i.e. in countercurrent in line with the direction C' relative to the polymer gel flow in line with direction C. In the present case, to promote this flow in the lower region of the conveyor belt in the upstream drier zone 110 (here the first drier zone, which is also referred to as start zone AZ), a waste air element 331 is provided and, in the penultimate (here the sixth) drier zone 160, an air supply element 330. The drier setup 101 is supplied within large portions of the interior 101i, preferably the entirety, with a reduced pressure p_U relative to an ambient pressure p_A (atmospheric pressure), in order to implement the countercurrent flow of drying air in countercurrent direction C' counter to conveying direction C. Owing to the partly gas-permeable configuration of the inlet 101e (with respect to the polymer gel flow) and outlet 101a of the drier setup 101, with respect to the interior 101i thereof, the ambient pressure p_A (atmospheric pressure) is also at least roughly established in the transition regions to the environment, namely also in the input module 200 and in the discharge module 300.

The belt drier 1000 has an endless conveyor belt 400 conducted over bearing elements and two deflecting rolls 410A and 410B, at least one of which is driven. The bearing case of the deflecting roll 410A of the conveyor belt 400 and the associated mechanical belt tensioning device, in the present case, are in the input module 200, and the driveshaft with the inserted belt drive in the discharge module 300. On the conveyor belt 400 of the belt drier 1000, the aqueous polymer gel 420 is gradually run through the multiple drier zones 110, 120, 130, 140, 150, 160 arranged in succession and through the last drier zone 170 to the discharge module 300. Here, the penultimate drier zone 160 and the last drier zone 170 are referred to as a number of last drier zones 310 upstream of the discharge module 300, to which reference is made hereinafter. The number of last drier zones 310 with the discharge module 300 is referred to here as end zone EZ, to which reference is also made hereinafter. The number of last drier zones 310 may, in a modification, also comprise one or more than two drier zones.

As recognized by the concept of the invention, it can be found to be problematic that, in the region of the end zone EZ, there is a major pressure transition from the atmospheric pressure p_A or similar ambient pressure (which may also exist in the discharge module 300 outside the drier setup 101) to the reduced pressure p_U in the interior 101i of the drier setup 101; the pressure transition in the present case exists especially between the last drier zone 170 and the discharge module 300. The reduced pressure p_U is desired in order to avoid disadvantageous and uncontrolled emissions of hot drying air, possibly with dust or other gaseous emissions, into the environment of the drier. However, the reduced pressure p_U, owing to the pressure transition to the ambient pressure (atmospheric pressure) p_A, can also cause unwanted intake of infiltrated air and/or intake of particles into the drier setup 101, especially intake of infiltrated air and intake of particles entrained as a result.

The modules assigned to the drier zones 110, 120, 130, 140, 150, 160, 170 in the present case, in terms of construction, are formed from and divided by standardized metal sheets stiffened with profiles as base, side and top walls. The input module 200 is formed here with profiles of stiffened standardized base and side sheets. The product applicator 210 takes the form here of a pivot belt. In addition, in modifications that are not shown here, a distributor screw or a pivot arm application device could be utilized. On the top side of the conveyor belt 400, the aqueous polymer gel is applied and transported by means of the conveyor belt 400 toward the discharge module 300, where it arrives in the form of dried superabsorbent polymer 420.

The conveyor belt 400 used here is a plate belt. Alternative conveyor belt variants include a chain-guided wire mesh belt, a hinged plate belt, an interlaced belt or a wire mesh belt which is guided in a chain-free manner, or similar executions made for example, from plastic rather than metal. The polymer gel 420 to be dried—i.e. aqueous polymer gel to be dried, which is dried to give dried superabsorbent polymer—for the sake of simplicity is labelled 420 here overall. The polymer gel 420 lies on a conveyor belt 400 which is perforated here, and the drying air represented by arrows flows over and through it in different flow directions.

This is because drying air flows over the polymer gel 420 in countercurrent direction C' and, in a drier zone TZ—with circulation of the drying air transverse to the countercurrent flow direction C'—circulating air UL additionally flows through it; this corresponds to a superimposition of crosscurrent and countercurrent flow of the drying air with respect to the polymer gel 420. Thus, drying air flows through or over the polymer gel 420, at first still in the form of aqueous polymer gel, while it is being transported on the conveyor belt 400 through the interior 101i of the drier setup 101 in line with conveying direction C, and it is dried as a result. The drying air—preferably in a plane transverse to conveying direction C—is conducted as circulating air UL in order to experience maximum saturation with moisture in the course of multiple passage through the aqueous polymer gel 420 to be dried.

A certain proportion of the drying air (not shown in FIG. 1, shown as waste air AL in FIG. 7) leaves the belt drier 1000 highly saturated with moisture and thus removes the amount of water that has evaporated out of the polymer gel. A corresponding waste air flow regime 360 is elucidated by way of example in relation to FIG. 7. It is likewise possible for recycled air RL to be recycled, at least from the end zone EZ, into a drier zone TZ which, viewed in conveying direction C, is upstream of the end zone EZ; for example, as shown in FIG. 1, recycled air RL can be recycled from the last drier zone 170 to the upstream drier zones 110, 120 (where it is blown in from beneath) and 130, 140, 150 (where it is blown in from above).

A drier zone TZ may serve to establish appropriate drying conditions and, according to the convenience thereof, is assigned an air feed and air outlet within the scope of a ventilation construction 102; here, this comprises installed or added-on heating registers/ventilators 10A, 10B and/or heat exchangers. In the present case, for each drier zone 110, 120, 130, 140, 150, 160, heat exchangers designated WT1, WT2, WT3, WT4, WT5 are provided. A more detailed working example in this respect (similarly to that of FIG. 1) is elucidated in relation to FIG. 7.

In the working example of FIG. 1, the drier module 100 is set up in the interior 101$i$ of the drier setup 101 with a pressure zone DZ both for the drier zones 110 (start zone AZ), 120, 130, 140, 150 and for the last two drier zones 160, 170. All drier zones 110 (start zone AZ), 120, 130, 140, 150, 160, 170—i.e. in the present case the entire pressure zone DZ—is operated substantially under reduced pressure p_U. In a fitting manner, an appropriate temperature variation along the drier zones 110 (start zone AZ), 120, 130, 140, 150, 160, 170 may be provided.

Each drier zone TZ may, but need not, be implemented as a single drier module. Each drier zone TZ may, but need not, also be implemented with a number of drier modules. A modular construction can have advantages if the construction of the belt drier 1000 is to be modifiable, especially for manufacturing reasons. In the present case, the drier zones 110, 120, 130, 140, 150, 160, 170 are each formed by a drier module and—apart from the last drier zone 170—have at least one air circulation ventilator 10A, 10B, here advantageously with a heating register. It is possible here for each drier zone 110, 120, 130, 140, 150, 160 to be controlled individually. The flow of drying air (or optionally cooling air) toward the polymer gel in countercurrent flow direction C' may be varied. The inflow direction through the superabsorbent polymer gel is, for example, from the bottom upward in the upstream drier zones 110, 120 or, for example, from the top downward in the further drier zones 130, 140, 150. The drying arrangement of a belt drier 1000 shown in FIG. 1 thus shows that, in a drier zone, or here in the upstream drier zones 110 and 120, the air flow toward the polymer gel 420 in the form of aqueous polymer gel is from the bottom upward and then, in the further drier zones 130, 140 and 150 and 160, the air flow toward the polymer gel 420 in the form of superabsorbent polymer is from the top downward. This increasingly transforms the superabsorbent polymer, as a result of drying, from aqueous polymer gel to dried polymer gel in the form of a sheetlike strand.

The drying time can be affected by the belt speed of the conveyor belt 400, which may be continuously adjustable. The polymer gel 420 in the form of water-absorbing polymer particles that cohere and/or adhere to one another on the conveyor belt 400 to form a sheetlike strand, after the drying process, is thrown off the conveyor belt in the discharge module 300 and the sheetlike strand is crushed in a crusher 410C. Subsequently, the water-absorbing polymer particles are ground, if appropriate in accordance with the particle size to be established. The discharge module 300 is configured such that the dried superabsorbent polymer 420 is thrown off the belt in strand form via the downstream deflecting roll 410B into the crusher 410C, i.e. is removable with water-absorbing polymer particles that cohere or adhere to form the strand; the strand in the region of the downstream deflecting roll 410B slides into a crusher 410C. The deflecting rolls 410A and 410B ensure that the conveyor belt 400 is returned counter to the conveying direction C, as an endless belt, and is available again in an endless loop for further application of aqueous polymer gel. The belt drier 1000 is adjusted such that the aqueous polymer gel applied is subjected to a drying process appropriate for the condition of the aqueous polymer gel applied. The production costs should be reduced here, and the production method improved or the production time reduced.

The dotted lines in FIG. 1 in the downstream part of the belt drier 1000 symbolically represent an aforementioned end zone EZ which here comprises the penultimate drier zone 160, the last drier zone 170 and the discharge module 300. The last drier zone 170 and the penultimate drier zone 160 here represent, by way of example, a number of last drier zones (in conveying direction C), which are labelled 310 hereinafter and are elucidated individually with reference to multiple examples in FIG. 2 to FIG. 7. In a modification, it would also be possible for just the last drier zone 170 to be encompassed by the number of last drier zones 310. The end zone EZ of the belt drier 1000 in that case comprised just the last drier zone 170 with the discharge module 300. In terms of construction, the last drier zone 170 could be integrated with the discharge module 300 within an end zone EZ.

According to FIG. 1, especially in the region of the number of last drier zones 310, circulating air UL, optionally together with a portion of ambient air, is circulated through the polymer gel 420 (in the number of last drier zones 310 or very substantially in the form of dried polymer gel comprising water-absorbing polymer particles). In the present case, in the lower portion of the conveyor belt, an air supply element 330 (in a modification optionally also a waste air element) is provided in the penultimate drier zone 160. In the present case, in the lower portion of the conveyor belt, a waste air element 331 (in a modification optionally also an air supply element) is provided in the drier zone 110 furthest upstream.

An air circulation ventilator 320, in the present case, is used in the upper region of the conveyor belt 400, such that it is additionally possible to circulate circulating air UL through the polymer gel 420 (in the number of last drier zone 310 already substantially in the form of dried polymer gel comprising water absorbing polymer particles). This assures advantageous drying characteristics in the penultimate drier zone 160 too.

In addition, an air withdrawal conduit 340 is integrated in the last drier zone 170; in other words, moisture-laden recycled air RL as shown in FIG. 1 is withdrawn by means of an air withdrawal conduit 340 in the last drier zone 170. The recycled air RL is fed back to one or more of the "upstream" drier zones 110, 120, 130, 140, 150, 160 via the heating registers/ventilators 10A, 10B incorporated or installed within the scope of a ventilation construction 102 and/or via a heat exchanger WT.

In order especially to solve the abovementioned problem of intake of infiltrated air and/or intake of particles in the end zone EZ, in the embodiment of a belt drier 1000 shown in FIG. 1, the drier module 100 in the interior 101$i$ of the drier setup is set up with a particularly well-defined pressure zone DZ in the region of the drier zone 160; i.e. for the last drier zones 310 upstream of the discharge module 300. The last drier zones 310 upstream of the discharge module 300 have a pressure transition variation from the reduced pressure p_U to the ambient pressure p_A, namely about atmospheric pressure, in the discharge module 300 and the outer region of the drier setup 101. These last drier zones 310 can also be operated with an appropriate temperature variation. To implement the pressure transition profile in the pressure zone DZ shown, for the last drier zones 310—here in the penultimate drier zone 160—in the interior 101i of the drier setup 101, one or more transverse walls 600 are provided for formation of a pressure gradient region GRAD shown in FIG. 2.

A transverse wall 600, in the working example of FIG. 1, has a first and second upper segmenting element 601, 602 above the conveyor belt 400, a first and second middle segmenting element 604, 606 between the conveyor belt (i.e. between the upper portion thereof running in conveying direction C and the lower portion thereof running counter to the conveying direction, i.e. in countercurrent direction C'), and a first and second lower segmenting element 605, 607 beneath the conveyor belt 400. For example, it is also possible in a modification, however, to form a transverse wall 600 even with just a first upper segmenting element 601. In principle, it is thus already possible to implement a desired effect of the pressure transition profile to reduce the problem mentioned of intake of infiltrated air and/or intake of particles.

Reference is made by way of example hereinafter to preferred upper segmenting elements 601, 602 as segmenting element of a transverse wall 600 for short. A transverse wall 600 may have at least one upper segmenting element 601, 602 and optionally one or more further middle segmenting elements 604, 606 and/or one or more further lower segmenting elements 605, 607.

Especially for a modified form of a belt drier which is not shown here, a conveyor belt may also be returned outside the drier setup 101. In this case, any possible middle and/or more particularly any possible lower segmenting elements 604, 605 are found to be less necessary or comparatively dispensable.

It can generally also be assumed that, because of the majority of a free volume in the drier setup 101 present above a conveyor belt 400, an upper segmenting element, i.e., for example, a first and/or second upper segmenting element 601, is the most effectively active. This is in order to achieve a division of the interior 101i of the drier setup 101 into one or more pressure zones DZ or additionally or alternatively to achieve division of a pressure zone DZ in the interior 101i of the drier setup 101 into pressure zone subregions. For this purpose, by way of example, FIG. 2 shows, in a symbolic manner, pressure zone subregions DZT1 and DZT2.

In a modification which is not shown here, it would also be possible in the penultimate drier zone 160 to utilize the air supply element 330 (and in a modification optionally also a waste air element) and an air circulation ventilator 320 in order to set up a second (downstream) pressure zone for the drier zones 160, 170 and a first (upstream) pressure zone for the drier zones 110, 120, 130, 140, 150.

With reference to FIG. 2, by means of one or more transverse walls 600—here optionally a single (upper) segmenting element 601 shown in a symbolic manner and similarly to the manner described with reference to FIG. 1—for the pressure zone DZ (or an above-described downstream pressure zone of the modification), a pressure profile DP between a polymer gel inlet 100A of the pressure zone DZ and a polymer gel outlet 100B of the pressure zone DZ can be established. The pressure profile DP is established in accordance with the pressure levels at a polymer gel inlet 100A of the pressure zone DZ and a polymer gel outlet 100B of the pressure zone DZ such that a second pressure differential $\Delta pB$ from the atmospheric pressure p_A in the polymer gel outlet 100B thereof is less than a first pressure differential $\Delta pA$ from the atmospheric pressure p_A at the polymer gel inlet 100A thereof.

In the present case—FIG. 1 and also FIG. 2—it is additionally possible to assign the downstream pressure zone subregion DZT2 to a last and penultimate drier zone 170, 160 (generally to a number of last drier zones 310 including the last drier zone 170), and the upstream pressure zone subregion DZT1 to the upstream drier zones 110, 120, 130, 140, 150. For further elucidation, FIG. 2 shows, in the lower portion thereof, by way of example and in simplified form, a pressure profile DP that extends over the interior 101i of the drier setup 101, which especially has a pressure gradient region GRAD1 between the polymer gel inlet 100A and the polymer gel outlet 100B of the pressure zone DZ and a pressure gradient region GRAD2 at the polymer gel outlet 100B. The pressure gradient region GRAD1 is the result of a first pressure stage DS1 or a similar pressure variation owing to the pressure drop at the segmenting element 601 as inner transverse wall in the pressure zone DZ. The pressure gradient region GRAD2 is the result of a second pressure stage DS2 or a similar pressure variation owing to the pressure drop at the polymer gel outlet 100B as outer transverse wall of the pressure zone DZ.

Segmenting elements 601 for an end zone EZ as in FIG. 1—and generally for a number of last drier zones 310 including the last drier zone upstream of the discharge module 300—may in principle also be provided for a pressure zone EZ as still to be elucidated with reference to FIG. 7. With appropriate open- or closed-loop control sensors or with suitable open- or closed-loop control means, it is also possible in principle to form a pressure zone DZ as an open- or closed-loop control zone at least for a predetermined pressure of the drying process, and possibly also for a predetermined temperature of the drying process.

In FIG. 2, first of all, virtually the entire interior of a drier setup 101 between inlet and outlet 101e, 101a takes the form of a pressure zone DZ with a pressure profile DP shown beneath. The pressure profile DP results essentially because of the positioning of the air feed element 330 in the polymer gel inlet 100A with a corresponding pressure level of a first internal pressure as inlet pressure, and of the air withdrawal conduit 340 at the polymer gel outlet 100B with a corresponding pressure level of a second internal pressure as outlet pressure. The lower schematic diagram in FIG. 2 shows the pressure variation that occurs as the pressure profile DP within the interior 101i of the drier setup 101 between the inlet and outlet 101e, 101a of the drier setup 101 with the pressure transition profile of a pressure gradient region GRAD1 which becomes established between polymer gel inlet and polymer gel outlet 100A, 100B, i.e. specifically between the upstream first pressure zone subregion DZT1 and the downstream second pressure zone subregion DZT2, and the pressure gradient region GRAD2 at the polymer gel outlet 100B.

It can be seen from this that the reduced pressure p_U that occurs here by way of example in the interior 101i of the drier setup 101 is at first, for example, −1.5 mbar at the inlet 101e and then, toward the end of the last drier zones 310, in the end zone EZ in the transition to the discharge module 300, at first rises in the pressure gradient region GRAD1 and then toward the outlet 101a in the pressure gradient region GRAD2; this is shown by a solid line labelled GRAD1 and GRAD2 at a pressure stage DS1 and DS2. In fact, over the majority of the length of the interior 101i of the drier setup 101, there will be a virtually constant (slightly rising) reduced pressure of −1.5 mbar (slightly rising, as shown), while a pressure gradient region GRAD2 with respect to ambient pressure is established at the polymer gel outlet 100B of the last drier zones 310; too great an abrupt rise that leads to problematic intake of infiltrated air is avoided, however, especially because, on account of the segmenting element 601, a pressure transition profile established with an increase in pressure is already achieved in the pressure gradient region GRAD1 at the pressure stage DS1.

This is because the input setting of a throttle (e.g. 710 in FIG. 7) and an output setting of a throttle (e.g. 720 in FIG. 7) can additionally establish a pressure profile DP with a moderate slope, such that, without segmentations 600 in the polymer gel outlet 100B of the last drier zones 310, in the end zone EZ upstream of the discharge module 300, there would be a jump in pressure with the full amplitude up to atmospheric pressure. Instead, the solid line indicates a reduced pressure gradient region GRAD2 in the polymer gel outlet 100B.

Quite similarly to FIG. 2, with reference to the above description, in the working example according to FIG. 3 as well, virtually the entire interior of a drier setup 101 between inlet and outlet 101e, 101a takes the form of a pressure zone DZ with a pressure profile DP shown beneath. According to FIG. 3, between a polymer gel inlet 100A and a polymer gel outlet 100B, a downstream (in conveying direction C) third pressure zone subregion DZT3 and middle second pressure zone subregion DZT2 are formed in the region of the last drier zones 310 upstream of the discharge module 300, as is an upstream (in conveying direction C) first pressure zone subregion DZT1. This particular pressure profile with the pressure stages DS1, DS2, DS3 and corresponding pressure gradient regions GRAD1, GRAD2, GRAD3 is formed according to FIG. 3 owing to the transverse wall 600 with the segmenting element 601 and the transverse wall 600' with the segmenting element 602 and the pendulum sheet 603. Thus, because of the transverse wall 600 between the middle second pressure zone subregion DZT2 and downstream third pressure zone subregion DZT3, a deliberately flattened pressure ramp is formed in countercurrent direction C' from the ambient pressure p_A to the reduced pressure p_U in the pressure zone DZ. This principle has been extended for the entire interior 101i of the drier setup 101, namely by means of an appropriate distribution of a further transverse wall 600' between the middle second pressure zone subregion DZT2 and upstream first pressure zone subregion DZT1 in the interior 101i of the drier setup 101.

For this purpose, still referring to FIG. 3, a belt drier 1000 with an input module 200, with a conveyor belt 400 which transports the polymer gel 420, with a drier module 100 and with a discharge module 300 and a region of last drier zones 310 is shown in schematic form. The region of last drier zones 310 comprises the particular middle second pressure zone subregion DZT2 and the downstream third pressure zone subregion DZT3, which are separated by a transverse wall 600 having sheets or similar segmenting elements 601, such that a pressure transition profile in the form of the second pressure stage DS2 is formed by the pressure gradient range GRAD2. The region upstream of the drier zones 310 comprises the particular upstream first pressure zone subregion DZT1 which is separated from the middle second pressure zone subregion DZT2 by a transverse wall 600' with the segmenting element 602 and the pendulum sheet 603, so as to form a pressure transition profile in the form of the first pressure stage DS1 with the pressure gradient region GRAD1.

The polymer gel 420 is thrown off at the deflecting roll 410B and falls into the crusher 410C. The particles and fine particles that arise as a result of abrasion, fracture or similar fracture and friction effects could normally (without the transverse walls 600, 600') be sucked into the interior 101i of the drier setup 101 by infiltrated air owing to the difference in pressure of ambient pressure p_A between the discharge module 300 and p_U in the interior 101i of the drier setup 101. A reduced pressure p_U for assistance of countercurrent flow of drying air in countercurrent direction C' (as in the embodiment of FIG. 2) can also be established in the embodiment of FIG. 3 by an air feed element 330 and/or a waste air element 331.

Intake of particles and fine particles is prevented, but at least distinctly reduced, by the additional advantageous setup as shown here of segmenting elements 601, 602, 603 in the case of the transverse walls 600, 600' with flattening of the pressure profile DP. The second pressure differential ΔpB from atmospheric pressure in the polymer gel outlet 100B of the drier setup 101, which has been reduced by the transverse wall 600, 600', is significantly smaller than a first pressure differential ΔpA from the atmospheric pressure at the polymer gel inlet 100A of the drier setup 101.

The pressure differential ΔpB from the atmospheric pressure at the polymer gel outlet 100B (in conveying direction—gas inlet in countercurrent direction C') is also established by an input setting of a throttle in the waste air element 331 (in a modification possibly also an air supply element) in the inlet 101e, and also by an output setting of a throttle in the air supply element 330 at the outlet 101a of the interior 101i of the drier setup 101.

The interior 101i of the drier setup 101 here thus has two transverse walls 600, 600' with a first and second segmenting element 601, 602 for spatial division of the interior 101i, such that a pressure profile multiply matched to the ambient pressure p_A with corresponding three pressure gradient regions GRAD1, GRAD2, GRAD3 and a first pressure plateau and a second pressure plateau (at least two plateau-like pressure levels) can be formed. In idealized form, the pressure profile will thus have three pressure gradient regions GRAD1, GRAD2, GRAD3, of which the pressure gradient GRAD3 to the atmospheric pressure that exists at the polymer gel outlet 100B of a pressure zone DZ is now very much smaller again compared to the gradient GRAD2 of FIG. 2.

In the lower portion of FIG. 3, the pressure profile DP established is additionally shown in schematic form. In this context, the solid line shows the illustrative reduced pressure p_U beginning at −1.5 mbar. The dotted line shows the atmospheric pressure or ambient pressure p_A at 0 mbar. There is a pressure differential in the first upstream region of the downstream pressure zone DZ and a pressure differential in the second downstream region of the downstream pressure zone DZ from atmospheric pressure, which is smaller than that in the first region. It is thus possible, with the segmenting element 601, to reduce a pressure differential from the environment at the polymer gel outlet 100B of the pressure zone DZ, and hence to reduce intake of infiltrated air and the associated intake of fine and ultrafine superabsorbent particles.

A second pressure differential ΔpB from atmospheric pressure p_A thus forms at the polymer gel outlet 100B of a pressure zone EZ, which (in terms of magnitude) here is less than −1 mbar, i.e. between 0 mbar and −1 mbar. In a spatially very extended region in line with a conveying direction C, an entire interior 101i of a drier setup 101 of a drier module 100, as in the present case, can form a pressure zone DZ; in a spatially more constricted region in line with a conveying direction C, in a modification, a pressure zone may also comprise a smaller number of drier zones, or else just a single drier zone as part of the drier setup 101 may form a pressure zone DZ. One example of this is elucidated with reference to FIG. 7.

The number of transverse walls 600 segmenting elements 601, 602 may—as shown here by way of example—be formed by means of one-piece sheets or elements—here by way of example a pendulum sheet 603—but also in another way. Given continuous movement of the belt 400, this defines the principle that the product height and the belt speed at least do not have any great effect on the pressure profile established.

In this context, the drier zone TZ assigned to the pressure zone DZ—shown here as a drier setup 101 of a drier module 100—comprises the last drier zone 170 of the belt drier upstream of a discharge module 300, such that the pressure profile is formed in an end zone EZ comprising the last drier zone. It is also possible here that the pressure profile is formed in this end zone EZ, preferably with a lowered temperature, such that a last drier zone (in the present case, by way of example, without a heat exchanger unit) is operated without a further increase in temperature of the polymer gel, formed, i.e. as a cooling zone.

The transverse wall 600 has a segmenting element 601 that causes a difference in pressure, which may be partly open, and may optionally also be formed such that it is merely suspended from above; it may be mounted in a fixed manner on the side wall or on the roof or consist of perforated sheets. Also possible are grids or pendulum sheets. The segmenting effect of the segmenting element 601 results here from the wall to give a pressure profile between a first upstream region of the downstream pressure zone DZ and a second downstream region of the downstream pressure zone DZ. Depending on the segmenting element 601 and the polymer gel bed density of the polymer gel to be established, a height-adjustable setup is conceivable here, such that the segmenting element 601 is height-adjustable.

In relation to FIG. 4 and FIG. 5, individual pressures, pressure ranges and distances between the segmenting elements are described. FIG. 4 shows, in schematic form, in view (A), in general terms, a pressure zone DZ for the interior 101i of a drier setup 101, preferably in the region of an above-elucidated end zone EZ upstream of a discharge module 300, for example for a number of last drier zones 310 or similar environment. View (B) shown in FIG. 4 shows a profile of a pressure transition plot in the pressure zone DZ.

While, in the interior 101i, a reduced pressure of, for example, down to about −8 mbar is defined in FIG. 4 (in other executions, the reduced pressure may quite possibly be down to at least −20 mbar or −30 mbar or more), there is an ambient pressure of $p\_A=0$ mbar (measured relative to the atmospheric pressure) in the environment. A pressure zone DZ with the above-elucidated formation of one or more transverse walls 600 permits a comparatively gradual adjustment of the reduced pressure $p\_U$ that exists in the pressure zone DZ in the interior 101i by means of section-by-section configuration of pressure section profiles, i.e. over the distance of the pressure zone DZ up to atmospheric pressure. Preferably, the at least one pressure zone DZ—each with a particular pressure profile DP, DP' in the interior 101i of the drier setup 101—is divided into one or more pressure zone subregions DZT, in such a way that a pressure section profile of a pressure profile DP, DP' of the pressure zone DZ exists in each pressure zone subregion. Excessively high pressure gradients and/or excessively high pressure amplitudes are thus avoided at the boundaries of the pressure zone DZ in conveying direction C or countercurrent direction C'. Thus, especially also for one of the last drier zones 310 described in FIG. 1 to FIG. 3, the tendency to draw infiltrated air and/or particles and/or fine or ultrafine particles from the environment into the interior 101i is avoided.

By way of example, view (A) shown in FIG. 4 shows a pressure zone DZ (if appropriate as a selection from multiple pressure zones) with a pressure profile DP, DP' in a view (B) between a polymer gel inlet 100A and a polymer gel outlet 100B; the pressure profile DP, DP' continues in adjoining regions of the interior 101i.

At the polymer gel inlet 100A of the pressure zone DZ, there exists a first internal pressure as inlet pressure $p\_e$, namely a reduced pressure of $p\_e=3.5$ mbar, above the conveyor belt 400. As apparent from the dotted pressure transition plot of the pressure profile DP from the reduced pressure $p\_U$ to the ambient pressure $p\_A$ in view (B) shown in FIG. 4, the pressure in the pressure zone rises from the inlet pressure $p\_e$ up to a second internal pressure as outlet pressure $p\_a$ at the polymer gel outlet 100B of the pressure zone DZ, namely up to a reduced pressure of $p\_a=-2.5$ mbar. In that case, this only accounts for a reduced difference up to the ambient pressure at 0 mbar (compared to the difference of the aforementioned general reduced pressure $p\_U$ at about −8 mbar in the interior 101i up to the ambient pressure at 0 mbar). The pressure zone DZ is bounded in the present case by transverse walls transverse to the conveying direction C in the interior 101i of the drier setup 101. These define corresponding pressure gradient regions labeled here generally as GRAD. By means of an arrangement of elements that supply air to the interior and elements that remove air from the interior (for example a waste air element 331 as described further down in the polymer gel inlet 100A or an air supply element 330 in the polymer gel outlet 100B), a pressure level in the interior 101i is defined, and hence a pressure is established.

The pressure drop across the conveyor belt and polymer gel here is, by way of example, about $\Delta p=2$ mbar. The inlet pressure at the polymer gel inlet 100A of the pressure zone DZ and outlet pressure at the polymer gel outlet 100B of the pressure zone DZ are correspondingly, beneath the conveyor belt 400, $p'\_e=-5.5$ mbar and $p'\_a=-4.5$ mbar—as apparent from the solid pressure transition plot of the pressure profile DP' from the reduced pressure $p'\_U=-8$ mbar to the ambient pressure $p\_A$ in the view (B) shown in FIG. 4, the pressure in the pressure zone rises up to an outlet pressure at the polymer gel outlet 100B of the pressure zone DZ of $p\_a=-4.5$ mbar; this accounts for only a reduced difference from the ambient pressure $p\_A$ at 0 mbar.

A pressure profile DP, DP' modified with respect to FIG. 4 can—as shown in FIG. 5 in the lower portion (B)—be formed according to the concept elucidated above by way of example; thus, the pressure profile DP, DP' of FIG. 4 can be modified further. This is effected—as shown in the upper part (A) of FIG. 5—by means of one or more transverse walls 600, especially with upper segmenting elements 601, 602, and/or by means of one or more transverse walls 600, especially with upper segmenting elements 601, 602 and middle and lower segmenting elements 604, 605. In this regard, one or more pressure zone subregions DZT that have been elucidated above and are shown by way of example in the lower part (B) of FIG. 5 may be provided in a pressure zone DZ, in such a way that there is a pressure section profile of a pressure profile DP, DP' of the pressure zone DZ in each pressure zone subregion DZT. The pressure section profiles are divided by means of the pressure gradient regions shown in schematic form at the bottom of FIG. 5, namely labeled here as GRAD, GRAD1, GRAD2 and GRAD3. Owing to the pressure drop at a transverse wall 600, 600', these arise, for instance, in the form of a pressure stage, pressure ramp or similar pressure variation. For this purpose, FIG. 5 shows, in the upper part, in schematic form, two transverse walls 600 each having an upper, middle and lower segmenting element 601, 604, 605 for delimitation of a pressure zone DZ at the polymer gel inlet and polymer gel outlet 100A, 100B thereof (in conveying direction C or counter to countercurrent direction C'). Additionally shown are two transverse walls 600' within the pressure zone DZ for formation of a pressure gradient region GRAD1, GRAD2 (analogously to the manner shown and elucidated, by way of example, in the lower portion of each of FIG. 2, FIG. 3 or FIG. 4). The transverse walls 600' are each formed with a segmenting element 602 and a pendulum sheet 603 above the conveyor belt 400. The segmenting element 601 may be height-adjustable as set out above; more particularly, it may be adjusted such that it matches the applied layer thicknesses of polymer gel 420. In the present case, the lowermost edge of an upper segmenting element 601 preferably maintains a distance of D=30 cm, especially 20 cm, but at least D=10 cm, from the upper face of the polymer gel 420. The uppermost segmenting element is preferably a partition plate. The lowermost edge of an upper segmenting element 602, 603 preferably maintains at least a distance of d=20 cm, but at least d=5 cm, from the upper face of the polymer gel 420. Preferably, the upper segmenting element 602, 603 is a pendulum sheet. In principle, it is also possible that d=0 cm, but the free swinging of a pendulum sheet with a finite minimum distance is preferred. The upper face of the polymer gel 420 is in principle understood to mean a mean level of the actual upper edge of the polymer gel 420 which is established in operation.

Preferably, in operation of the belt drier 1000, a layer thickness, i.e. the mean level, is set with matching of a throughput to a belt speed of the conveyor belt 400; for this purpose, it is possible to utilize a rail, not shown here, for leveling of the layer thickness. In the context of a preferred development, a distance of a lowermost edge of an upper segmenting element 601, 602, 603 (albeit possibly depending on the throughput in the manner elucidated above), in principle, is greater in an upstream region of the drier setup 101$i$ (i.e., for instance, in the region of a start zone AZ described in FIG. 1) than in a downstream region of the drier setup 101$i$ (i.e., for instance, in the region of a last drier zone 310 or end zone EZ described in FIG. 1). In this way, it is possible in a preferred manner to take account of the fact that the superabsorbent polymer gel 420 on the conveyor belt 400 is still moister in the upstream region of the drier setup 101$i$ than in the downstream region of the drier setup 101$i$.

The distances D, d assure the implementation of a sufficient countercurrent flow of drying air in countercurrent flow direction C', and secondly permit the formation of a pressure transition profile as mentioned, according to the example of a pressure gradient region GRAD.

In principle, the segmenting elements 601, 602 may be welded on in the interior 101$i$ of a drier setup 101; i.e., in particular, welded onto a wall thereof. However, it has been found that the connection between segmenting element 601, 602 and drier setup 101 is subject to comparatively high differences in temperature and variations in temperature; this leads to comparatively high thermal stresses in a weld bond owing to different absolute expansions of the segmenting elements 601, 602 on the one hand and the drier setup 101 on the other hand.

It has been found to be advantageous to implement a bond between segmenting element 601, 602 and drier setup 101 by means of a frame 700 shown in symbolic form in the upper part (A) and in view (C) of FIG. 5. Preferably, this frame is cohesively bonded—as shown here—to the drier setup 101 only or to the segmenting element 601, 602 only.

The transverse wall 600, 600' or the segmenting element 601, 602, 603, 604, 605 may be mounted on the frame 700 when the frame 700 is cohesively bonded to the drier setup 101 only. The segmenting element 601, 602, 603, 604, 605 is mounted on the frame 700 with play S, preferably by means of a screw connection, for example in an elongated hole.

In principle, in a modification, the frame may be mounted on the drier setup 101 with play when the frame is cohesively bonded to the segmenting element 601, 602 only. In that case, the frame is mounted on the drier setup 101 with play, preferably by means of a screw connection, for example in an elongated hole.

The mounting of the segmenting element 601, 602 on the frame with play S—as shown here—allows a certain degree of relative expansion of segmenting element 601, 602, 603, 604, 605 and drier setup 101, such that expansion stresses at the connection sites are kept low. The bond is comparatively long-lived; any weld seams are freed from expansion stresses.

There follows a general description, with reference to FIG. 6, of the production process for producing water-absorbing polymer particles with the drying step S3. In process step S1A, the monomer preparation of an aqueous monomer solution or suspension is effected, and these arrive together in the polymerization process in process step S1 through addition with further initiators, additives or recycling products. On conclusion of polymerization, the gel preparation of a superabsorbent polymer in the state of an aqueous polymer gel is effected in process step S2. Thereafter, the aqueous polymer gel is applied as polymer gel 420 to the conveyor belt 400 at the input module 200 and, in process step S3, the polymer gel 420 is dried to give a superabsorbent polymer in the state of water-absorbent polymer particles. The advantage of an above-elucidated improved pressure profile of a pressure transition with a pressure gradient region GRAD in a pressure zone DZ is firstly a minimization of the waste products and associated maintenance operations, or cleaning, which leads to a reduction in costs. In addition, owing to the reduced soiling, a drying quality is more constant and, associated with this, a variation in the polymer gel quality, for example the particle size, is minimized in principle. After the drying in process step S3, and the water-absorbing polymer particles are ground in process step S4, what is called the sizing of the water-absorbing polymer particles in process step S5 is effected to give what is called a base polymer. The particle sizes of the base polymer having defined particles that are established in the sizing are transferred to the postreaction in process step S6. In this process step, further additives are added in process step S6A. Thereafter, in process step S7, there is another sizing of the end product to establish particular particle sizes of defined particles in the end product of the superabsorbent. This is followed by the packing of the superabsorbents. The fine and ultrafine superabsorbent particles that occur as waste products can be returned to the process of polymerization via process step S1B in process step S1 and hence recovered, especially from process steps S5 and S7. The wastes that occur in step S3 have to be discarded.

FIG. 7 shows a schematic of a drier module 100 with a drier setup 101 and a ventilation setup 102. The ventilation setup 102 has an air withdrawal conduit 340 as in FIG. 1 and an air recycling conduit 350, which are connected to the drier setup 101. For formation of the drier module 100, the ventilation setup 102 is set atop and/or attached to the drier setup 101—as in FIG. 1—with appropriate air circulation units 320—here a ventilator—or air supply elements 330 to some degree—here a valve, or in other kind of throttle, to the extent required (in principle, preference is given here to very substantially resistance-free, i.e. unthrottled, air supply). The air recycling conduit 350 has a series of internals of the type elucidated above, namely in the present case a ventilator 351 for circulation of the recycled air RL and/or fresh air FL via a heat exchanger 352.

In addition, in the belt drier 1000 shown in schematic form in FIG. 7, a waste air conduit 360 of the ventilation setup 102 for guiding moisture-laden waste air AL is provided, which is not intended for recycling, but is released into the environment via a release throttle 362. The waste air conduit 360 likewise has internals, such as a ventilator 361 for sucking in the moisture-laden waste air AL from one or more drier zones TZi (i=1 . . . 5), which is not specified in detail in FIG. 7. The waste air AL is intended for release to the environment via the release throttle 362. A number of last drier zones 310 upstream of the discharge module 300 of the drier setup 101 are shown and form a preferred pressure zone DZ_n, the pressure transition profile of which, with a preferred pressure profile of a pressure gradient region GRAD, is shown in enlarged form in the detail X.

The number of last drier zones 310—as in the embodiments elucidated above—has an air circulation ventilator 320 and an air supply element 330, which should be understood here as an example. In a modification which is not shown here, it is also possible for multiple air circulation ventilators 320 and/or air supply elements 330 or else heat exchangers to be provided in each of the drier zones TZ which are not specified in detail here. In the present case, each drier zone TZn is assigned a pressure zone DZn (here i=1, 3, n−2, n−1, n), or the number of last drier zones 310 is assigned an abovementioned particularly preferred pressure zone DZn.

In addition, recycling of drying air as recycled air RL from one of the last drier zone 310 into a drier zone upstream counter to conveying direction (C) (in FIG. 1 this is, by way of example, the drier zone 130) is possible, since the drying air from one of the last drier zone 310 is laden with a comparatively low level of moisture; by means of recycling, it is possible to introduce warm drying air in energy-efficient manner into one or more of the upstream drier zones based on the conveying direction C. For this purpose, the first throttle 342 shown as a throttle valve for formation of a recycled air throttle in the air withdrawal line 341, and the second throttle 343 (the latter optionally for formation of a recycled air bypass throttle in a bypass line) are provided. The third throttle 344 as mounted overall throttle is in the air withdrawal line 341 to the air recycling line 354 in order to regulate the stream of recycled air RL. The fourth throttle 345 may be mounted to form an air supply bypass throttle (in a further bypass line for formation of an air supply bypass), in order to introduce supply air from the environment into the air recycling conduit 354.

In the belt drier 1000 shown in FIG. 7, the interior 101$i$ of the drier setup 101 is divided in line with conveying direction C of the conveyor belt 400 into more than one pressure zone DZ, namely a number of pressure zones DZi, where, in FIG. 7, four of the six or seven pressure zones DZi (i=1, 3, n−2, n−1, n where n is any number, for example n=7), for example, are shown by way of example in different executions.

In the belt drier 1000 of FIG. 7, a pressure zone DZi is equipped in each case with a number of one or more (for example four or five) heat exchangers WT1, WT3, WTn−2, WTn−1, WTn; these may, for example, each be part of a drier module which can be assembled together with the other drier modules. The division of the pressure zones DZi may arise from a pressure profile elucidated with reference to the previous FIG. 1 to FIG. 6 and may be implemented, for example, in a functional manner and/or by construction for establishment of a pressure or pressure profile. More particularly, there is a division into a number of pressure zones DZ1, DZ3, DZn−2, Dzn−1, DZn as described by way of example with reference to FIG. 7. What is shown there is an arrangement of elements that supply air to the interior (e.g. an air circulation ventilator 320 or similar air supply element) and elements that remove air from the interior (e.g. a waste air throttle 363 or similar waste air element 331), which define a pressure level in the interior, and hence establish a pressure; for this purpose, FIG. 1 and FIG. 2 show, for example, an air supply element 330 and a waste air element 331 by which a pressure level is defined in the interior 101$i$, and hence a pressure is established. The inner region of the drier setup can accordingly be divided into one or more regions that are optionally adjustable with respect to the pressure, especially controllable, namely the pressure zones DZi (i=1 n) that are shown here.

In the manner specified by way of example here, it is also possible for multiple (not shown in FIG. n) drier zones TZi (i=1 . . . 5) to be combined to form a pressure zone DZn, DZn-1; for each pressure zone DZ, it is possible here to provide temperature sensors and in particular pressure sensors that are not described in detail, which serve either merely as measurement points or additionally or alternatively as open- and/or closed-loop control sensors. In addition, it is also possible for each pressure zone DZ_n, DZ_n−1 to have at least one air supply element 330 and or a waste air element 331, for example one air circulation ventilator 320 and/or one waste air throttle 363 or throttle valve or the like each.

The upstream pressure zones in conveying direction C as designated here as DZ1 and DZ3, each extend over exactly one drier zone TZ in each case, as shown in FIG. 7. In the present case, these are executed as pressure zone DZ1 with two heat exchangers WT, pressure zone DZ3 with three heat exchangers WT, pressure zone DZ_n−2 with five heat exchangers WT and pressure zone DZ_n−1 with four heat exchangers WT; the further particularly preferred pressure zone DZn assigned to the last drier zones 310 is executed without a heat exchanger WT. The pressure zone DZn assigned to the number of last drier zones 310 extends over the last drier zones 310 (with air circulation, brought about by means of an air circulation ventilator 320 and an air supply element 330).

It should be elucidated by way of example with reference to pressure zone DZ3 that each of the pressure zones has a pressure zone boundary, where the pressure zone boundary is formed by means of a transverse wall QWe at the polymer gel inlet and by means of a transverse wall QWa at the polymer gel outlet of a drier zone TZ in the interior transverse to the conveying direction C of the conveyor belt. The pressure zone boundary of the pressure zone DZ3 is also marked in the present case by a first air-guiding orifice LF1 arranged in the polymer gel inlet which is not specified in detail, and this opens into a waste air conduit 360 for waste air AL. In addition, the pressure zone DZ3 in the polymer gel outlet is bounded by an air-guiding orifice LF2 arranged therein, which constitutes the opening in an air supply section 370 of an air recycling conduit 350 into the pressure zone DZ3. Each of the air-guiding orifices LF1, LF2 has a throttle which, in the present case, can be referred to as inlet throttle 710 and outlet throttle 720. In this respect, the above statements are also applicable to the furthest upstream (i.e. first) pressure zone DZ1 of the drier setup 101 in conveying direction C, as shown in FIG. 7, in the form of a start zone AZ; there are corresponding designations of an air-guiding orifice LF1 on the inlet side with inlet throttle 710 and air-guiding orifice LF2 on the outlet side with outlet throttle 720.

Both the upstream pressure zones of this kind can directly adjoin one another, but they can also, like the present DZ1, DZ3 here, be spaced apart, namely as in this present case by a second pressure zone which is not shown in detail. For example, it is generally possible for the two upstream pressure zones to be spaced apart and connected by a further pressure zone having any number of drier zones or else by multiple pressure zones DZ each having any number of drier zones. An intervening pressure zone, such as a second pressure zone not shown in detail in this present case, has at least one drier zone.

Both the first pressure zone DZ1 and the third pressure zone DZ3 in this present case have an inner wall in the form of a transverse wall QWi in the interior of the drier setup 101. Such a transverse wall QWi in the form of an inner wall in a pressure zone DZ in this present case is in the form of an above-elucidated transverse wall 600 and may have segmenting elements 601, 602, 604, 605. A segmenting element 603 may take the form, for example, of a pendulum sheet 603 and/or an upper segmenting element 601, 602 may be height-adjustable and be mounted above the conveyor belt 400. In this respect, a transverse wall QWi, as inner wall in a pressure zone DZ, in the manner illustrated above, is suitable for formation of a pressure gradient region GRAD in the pressure zone DZ1, DZ3. There is a pressure gradient region GRAD in each case between polymer gel inlet 100A and polymer gel outlet 100B of the first pressure zone DZ1 or third pressure zone DZ3, and each comprises a pressure stage in the region of the inner wall QWi.

Accordingly, a pressure profile—for example with reference to a lower portion of FIG. 2 to FIG. 4—can be established with a pressure stage at the transverse wall QWi that forms an inner wall, such that (for instance as elucidated with regard to FIG. 4), a first internal pressure is established as inlet pressure p_e in an upstream region in each case of a pressure zone DZ1, DZ3 and a second internal pressure is established as outlet pressure p_a in a downstream region of the pressure zone DZ1, DZ3—i.e., in conveying direction C, beyond the transverse wall QWi of the pressure zone DZ1, DZ3 that takes the form of an inner wall, there is a second internal pressure as outlet pressure p_a which is different from the first internal pressure as inlet pressure p_e.

Accordingly, the pressure zone DZ_n−2—again spaced apart from pressure zone DZ3—is executed here without an inner wall, such that a substantially constant pressure level can be established across the entire pressure zone DZ_n−2 in conveying direction C between the transverse walls QWe at the inlet and QWa at the outlet. The pressure level in the pressure zone DZ_n−2 is significantly affected by the air-guiding orifice LF1 to the pressure zone DZ_n−2. Analogously, a substantially constant internal pressure is established in the pressure zone DZ_n−1, which is significantly affected by the air-guiding orifice LF1, labeled 330 here. The pressure zone DZ_n−1 has outer walls QWe, QWa.

The last and particularly preferred pressure zone DZn of the drier setup 101 in conveying direction C is assigned to the number of last drier zones 310. The pressure zone DZn in the present case has an upstream drier zone adjoining the polymer gel inlet 100A and a downstream cooling zone adjoining the polymer gel outlet 100B—namely the upstream drier zone with elements 320, 330 and the downstream cooling zone as elucidated with throttles 342, 343. The downstream cooling zone with throttles 341, 342 is formed in the present case without a heat exchanger unit and hence at lowered temperature.

The particularly preferred last pressure zone DZ_n in the present case has a number of transverse walls 600 shown in a symbolic manner, the upper segmenting elements 601 of which, shown by way of example, are mounted in a height-adjustable manner above the conveyor belt 400 and can be designed, for example, in one-piece form or as a segmenting element 602 with a pendulum sheet 602. In the particularly preferred last pressure zone DZ_n which is assigned to the number of last pressure zones 310, a pressure profile DP is thus established with multiple pressure gradient regions GRAD 1n with, in the present case, a multitude of pressure stages and, in each case, reduced pressure p_U rising stepwise in the interior 101i of the drier setup 101 up to atmospheric pressure p_A as ambient pressure; this is shown in enlarged form in the detail X. The number of pressure stages and the reduced pressure rising stepwise in each case corresponds to the number of transverse walls 600, since a pressure stage forms at each segmenting element 601 of the transverse walls 600.

According to the mode of operation and imperviousness of the segmenting elements 601, 602, 603, an idealized continuous pressure ramp of a pressure profile DP shown by dotted lines can also be established, which, proceeding from a reduced pressure p_U, from an inlet pressure p_e at the polymer gel inlet 100A of −1.5 mbar up to a preferred outlet pressure p_a at the polymer gel outlet 100B between a pressure differential of preferably −1 mbar to 0 mbar, approaches the ambient pressure p_A.

Ultimately, the effect of this type of pressure ramp of the pressure profile DP, because of the transverse walls 600 in the last pressure zone DZ_n (i.e. here specifically in the last number of drier zones 310 upstream of a discharge module 300), is that, in the immediate region of the outlet orifice at the inlet 101e (named with respect to the conveying of the polymer gel 420) to the interior 101i of the drier setup 101 and outlet 101a to the interior 101i of the drier setup 101, i.e. as shown here for the outlet 101a of the drier setup 101 to the environment, an excessively high pressure jump is avoided.

The concept has recognized that excessively high pressure jumps established (in the case of missing transverse walls 600) have the tendency to promote disadvantageous intake of infiltrated air and hence also intake of particles into the interior 101i of the drier setup 101. In the present case, a pressure ramp that at least adapts via the extension of the number of last drier zones 310 in the last pressure zone DZ_n is achieved by means of the segmenting elements 601.

Such a measure can also be found to be advantageous in the case of a first pressure zone DZ1 (for example assigned to a drier zone TZ to be identified as start zone). An internal pressure can be lowered gradually, i.e. over the extent of the first pressure zone DZ1 from the ambient pressure p_A, especially atmospheric pressure, to the internal pressure p_U in the interior 101i in the drier setup 101, for example at −1.5 mbar. The reduced pressure values are reported as differential pressures from the atmospheric pressure p_A of the environment—the atmospheric pressure of the environment should thus be stated as 0 mbar. Rather than segmenting with segmenting elements 601—but with a similar function to segmenting—it is possible, in such a first pressure zone DZ1 (start zone AZ) but also in an end zone EZ, for example, for a transverse wall 600 also to be formed a lamellar seal or a suitable array of multiple curtains of metal sheets or a similar relatively loose sealing measure, which constitutes an alternative to segmenting with large metal sheets, but with a similar effect.

In the first pressure zone DZ1 at the inlet 101e of the drier setup 101, these measures are beneficial for energy efficiency in particular, since intake of infiltrated air into the interior 101i of the drier setup 101 is avoided. The measure of segmenting in the end zone EZ in the last number of drier zones 310 upstream of a discharge module 310 with metal sheets serves in particular to minimize infiltrated air and resultant intake of particles at the outlet 101a. At the inlet 101e of the drier setup 101, the simple sucking-in of air is avoided. A pressure ramp DR at the outlet 101a of the drier setup 101 is suitable for preventing intake of air and intake of particles.

REFERENCE NUMERALS

1000 belt drier, especially air circulation belt drier
10A heating register and/or ventilator installed at the bottom
10B heating register and/or ventilator installed at the top
100 drier module
100A polymer gel inlet of a preferred pressure zone
100B polymer gel outlet of a preferred pressure zone
101 drier setup
101e inlet of the drier setup 101
101a outlet of the drier setup 101
101i interior of the drier setup 101
102 ventilation setup
110 drier zone 1
120 drier zone 2
130 drier zone 3
140 drier zone 4
150 drier zone 5
160 drier zone 6
170 last drier zone
200 inlet module
210 product applicator
300 output module
310 number of last drier zones
320 air circulation ventilator
330 air supply element
331 waste air element
340 air withdrawal conduit
341 air withdrawal line
342 first throttle with throttle valve
343 second throttle with throttle valve
350 air recycling conduit
351 ventilator
352 heat exchanger
354 air recycling line
360 waste air conduit
361 ventilator
362 release throttle
363 waste air throttle
370 air-supplying sections
400 conveyor belt
410A, 410B deflecting rolls A and B
410C baffle
420 polymer gel, aqueous polymer gel prior to drying/dried superabsorbent polymer gel in particles after drying
600 transverse wall
601, 602 upper segmenting element, above the conveyor belt
603 pendulum sheet
604, 606 middle segmenting element, between the conveyor belt
605, 607 lower segmenting element, beneath the conveyor belt
700 frame
710/720 input throttle/output throttle
S play
FL fresh air
AL waste air
C conveying direction
C' countercurrent direction
UL circulating air
RL recycled air
TZ drier zone
DZ pressure zone, for example downstream and upstream pressure zones
DZT1, DZT2, DZT3 pressure zone subregions
DP pressure profile
DS1, DS2, DS3 pressure stage
WT1 . . . WT3, WTn−2, WTn−1 heat exchangers
EZ end zone
AZ start zone
GRAD, GRAD1, GRAD2, GRAD3 pressure gradient range
S1, S1A, S1B, S2, . . . S6, S6A, S7 process steps
QW, QWe, QWa, QWi transverse wall, at inlet, at outlet, inside and above, between and below the conveyor belt.
p_A ambient pressure (atmospheric pressure) relative to the interior 101i
p_U reduced pressure in the interior 101i
p_e, p_a inlet pressure, outlet pressure to the pressure zone DZ
ΔpA, ΔpB first, second pressure differential

The invention claimed is:

1. A production process for production of water absorbing polymer particles, where the production process has the following process steps:
polymerizing (S1) an aqueous monomer solution or suspension for production of an aqueous polymer gel (S2),
drying (S3) the aqueous polymer gel in a belt drier with a conveyor belt (400), by accommodating the aqueous polymer gel on the conveyor belt (400) and conveying the polymer gel on the conveyor belt (400) in a conveying direction (C) of the conveyor belt (400),
crushing and/or grinding (S4) the dried polymer gel to give water-absorbing polymer particles, where, for drying (S3):
the belt drier has a drier setup (101) in the interior (101i) of which the conveyor belt (400) is guided, wherein drying air in the interior (101i) of the drier setup (101) is conducted in countercurrent (C') counter to the conveying direction (C) and the interior of the drier setup (101) is kept at a reduced pressure (p_U) relative to the ambient pressure (p_A) outside the drier setup (101), and the interior (101i) has a pressure zone (DZ), wherein, in line with conveying direction (C):
a first internal pressure is formed as inlet pressure at a polymer gel inlet (100A) in at least one of the pressure zone (DZ) with a first pressure differential (ΔpA) from an ambient pressure (p_A), and
a second internal pressure is formed as outlet pressure at a polymer gel outlet (100B) in the at least one pressure zone (DZ) with a second pressure differential (ΔpB) from an ambient pressure (p_A), where the second pressure differential (ΔpB) is smaller than the first pressure differential wherein the pressure zone (DZ) in the interior (101i) of the drier setup (101) or a pressure zone subregion (DZT1, DZT2) of the pressure zone (DZ) is bounded by means of a transverse wall (QWa, QWe, QWi) oriented at right angles to the conveying direction of the conveyor belt.

2. The production process according to claim 1, wherein a pressure profile (DP) is formed, having at least one pressure gradient range (GRAD) at or between the polymer gel inlet (100A) and the polymer gel outlet (100B) of the pressure zone (DZ), and the pressure gradient region (GRAD) has a pressure stage (DS1, DS2, DS3), pressure ramp or pressure variation at a transverse wall (QWa, QWe, QWi).

3. The production process according to claim 1, wherein the interior (101i) of the drier setup (101) is divided into a number of one or more pressure zones (DZ) and/or pressure zone subregions (DZT1, DZT2), and/or
at least one pressure zone (DZ) extends over at least one or more than one, last drier zones (TZ, 310),
and/or the number of one or more pressure zones (DZ) and/or pressure zone subregions (DZT1, DZT2) is formed within an end zone (EZ) upstream of a discharge module (300).

4. The production process according to claim 1, wherein the interior of the drier setup (101) is kept at a reduced pressure (p_U) within a region of up to −20 mbar, relative to the ambient pressure (p_A) outside the drier setup (101), and the ambient pressure (p_A) is an atmospheric pressure outside the drier setup (101).

5. The production process according to claim 1, wherein the first and second pressure differentials from ambient pressure are based on an internal pressure above the conveyor belt (400), where the internal pressure above the conveyor belt (400) is a reduced pressure in the range of up to −10 mbar, and/or an internal pressure beneath the conveyor belt (400) has been lowered by a value between 0.5 mbar and 5 mbar compared to the internal pressure above the conveyor belt (400), with aqueous polymer gel lying on the conveyor belt (400).

6. The production process according to claim 1, wherein the first and second pressure differentials from ambient pressure are based on an internal pressure above the conveyor belt (400), where
the first pressure differential from atmospheric pressure at a polymer gel inlet (100A) of the pressure zone (DZ) is between −10 mbar and −1 mbar, and/or
the second pressure differential from atmospheric pressure at a polymer gel outlet (100B) of the pressure zone (DZ) is between −3 mbar and 0 mbar.

7. The production process according to claim 1, wherein a pressure profile (DP) of a pressure variation in the pressure zone (DZ) and/or pressure zone subregion (DZT1, DZT2) is adjustable independently of an ambient pressure, and/or
the pressure profile (DP) with respect to a pressure zone (DZ) and/or pressure zone subregion (DZT1, DZT2) forms through an input setting of an intake valve or intake throttle (710) at a polymer gel inlet (100A) to a pressure zone (DZ) and/or pressure zone subregion (DZT1, DZT2) and through an output setting of an output valve or output throttle (720) at the polymer gel outlet (100B) of a pressure zone (DZ) and/or pressure zone subregion (DZT1, DZT2).

8. The production process according to claim 1, wherein, for drying (S3):
an air withdrawal conduit (340) connected to the drier setup (101) to remove air and an air recycling conduit (350) connected to the drier setup (101) to supply air are formed, said air recycling conduit (350) being connected to said air withdrawal conduit (340), where recycled air (RL) is withdrawn from the drier setup (101), optionally from an end zone (EZ), and fed back via the air recycling conduit (350) to the drier setup (101), where an air withdrawal conduit (340) and/or air recycling conduit (350) is connected for flow purposes to a pressure zone (DZ), and/or
waste air from the drier setup (101) is removed at least partly in a waste air conduit (360), where the waste air conduit (360) proceeds from a further air-guiding orifice to the pressure zone, and/or
the belt drier takes the form of an air circulation belt drier operated with circulating air (UL) and which, to guide the circulating air, takes the form of a drier setup (101) comprising the conveyor belt (400), in which the drying air is circulated in a drying zone (TZ) as the circulating air (UL).

9. The production process according to claim 1, wherein, in the pressure zone (DZ), the pressure profile:
is formed by a throttle-controllable volume flow rate of feed air, optionally at the polymer gel inlet (100A) of the pressure zone (DZ) and/or pressure zone subregion (DZT1, DZT2), and/or
is formed by a throttle-controllable volume flow rate of waste air optionally at the polymer gel outlet (100B) of the pressure zone (DZ) and/or pressure zone subregion (DZT1, DZT2), and/or
the adjustment of the volume flow rates in the pressure zone (DZ), forms the pressure profile (DP).

10. The production process according to claim 1, wherein the pressure zone (DZ) is divided into a number of pressure zones.

11. A belt drier for drying an aqueous polymer gel in a production process according to claim 1, where
the belt drier has a drier setup (101) in the interior (101i) of which the conveyor belt (400) is guided,
wherein
drying air in the interior (101i) of the drier setup (101) can be conducted in countercurrent (C') counter to the conveying direction (C) and the interior of the drier setup (101) can be kept at a reduced pressure (p_U) relative to the ambient pressure (p_A) outside the drier setup (101), and the interior (101i) has and/or forms a pressure zone (DZ), wherein, in line with conveying direction (C):
a first internal pressure is formed as inlet pressure at a polymer gel inlet (100A) in at least one of the pressure zones (DZ) with a first pressure differential (ΔpA) from an ambient pressure (p_A) and
a second internal pressure is formed as outlet pressure at a polymer gel outlet (100B) in the at least one pressure zone (DZ) with a second pressure differential (ΔpB) from an ambient pressure (p_A), where
the second pressure differential (ΔpB) is smaller than the first pressure differential (ΔpA) wherein
the at least one pressure zone (DZ) in the interior (101i) of the drier setup (101) or a pressure zone subregion (DZT1, DZT2) thereof is bounded by means of a transverse wall (QWa, QWe, QWi) oriented at right angles to the conveying direction of the conveyor belt.

12. The belt drier according to claim 11, wherein
a pressure profile (DP) can be formed, having at least one pressure gradient range (GRAD) at or between the polymer gel inlet (100A) and the polymer gel outlet (100B) of the pressure zone (DZ), and/or the pressure gradient region (GRAD) has a pressure stage (DS1, DS2, DS3), pressure ramp or pressure variation at a transverse wall (QWa, QWe, QWi).

13. The belt drier according to claim 11, wherein a pressure zone (DZ) has a pressure zone boundary at the edge of the pressure zone (DZ), where
the pressure zone boundary is formed by means of an air-guiding orifice and/or an outside transverse wall (QWa, QWe) in the interior (101i) of the drier setup (101), where the transverse outer wall (QWa, QWe) is oriented at right angles to conveying direction (C) of the conveyor belt (400), and/or
the air-guiding orifice and/or the outside transverse wall (QWa, QWe) for formation of a pressure gradient range (GRAD) is arranged at the pressure zone boundary.

14. The belt drier according to claim 11, wherein a pressure zone (DZ) has a transverse inner wall (QWi) within the pressure zone and/or the transverse inner wall (QWi), as well as a transverse outer wall (QWa, QWe) of a pressure zone (DZ), is designed to form a pressure zone subregion (DZT1, DZT2) and/or a pressure gradient region (GRAD) in the pressure zone (DZ).

15. The belt drier (1000) according to claim 11, wherein a transverse wall (QWa, QWe, QWi) in the interior of the drier setup (101) which is oriented transverse to conveying direction (C) of the conveyor belt (400) has at least one segmenting element (600).

16. The belt drier (1000) according to claim 15, wherein the transverse wall (QWa, QWe, QWi) in the interior of the drier setup (101) has at least one upper segmenting element (601, 602) above the conveyor belt (400) and/or at least one lower segmenting element (605, 607) beneath the conveyor belt and/or at least one middle segmenting element (604, 606) between a part of the conveyor belt that runs in conveying direction (C) and a part of the conveyor belt that runs counter to conveying direction (C').

17. The belt drier (1000) according to claim 15, wherein a segmenting element (601, 602, 604, 605, 606, 607) is formed in one piece and/or formed with a pendulum sheet (603) and/or is height-adjustable.

18. The belt drier (1000) according to claim 11, wherein a connection between a segmenting element (601, 602, 604, 605, 606, 607) and the drier setup (101) is implemented by means of a frame.

19. The belt drier (1000) according to claim 18, wherein the frame is connected in a fixed manner to the drier setup (101) only or to the segmenting element (601, 602) only, and/or
the segmenting element is mounted with play on the frame if the frame is connected in a fixed manner to the drier setup (101) only and/or
the frame is mounted with play on the drier setup (101) if the frame is connected in a fixed manner to the segmenting element (601, 602, 604, 605, 606, 607) only.

* * * * *